(12) United States Patent
McGough

(10) Patent No.: US 6,445,797 B1
(45) Date of Patent: Sep. 3, 2002

(54) METHOD AND SYSTEM FOR PERFORMING SECURE ELECTRONIC DIGITAL STREAMING

(75) Inventor: Paul McGough, Chantilly, VA (US)

(73) Assignee: Secure Choice LLC, Chantilly, VA (US)

(*) Notice: Subject to any disclaimer, the term of this patent is extended or adjusted under 35 U.S.C. 154(b) by 0 days.

(21) Appl. No.: 09/212,294

(22) Filed: Dec. 16, 1998

(51) Int. Cl.$^7$ .............................. H04L 9/00; H04L 9/08

(52) U.S. Cl. ...................... 380/285; 380/44; 380/45; 380/268; 380/277; 380/262; 380/278

(58) Field of Search .............................. 380/28–30, 42, 380/45, 268

(56) References Cited

U.S. PATENT DOCUMENTS

| | | | |
|---|---|---|---|
| 4,068,089 A | * 1/1978 | Kuhnlein et al. | 380/52 |
| 4,133,973 A | * 1/1979 | Branscome et al. | 380/260 |
| 4,195,196 A | * 3/1980 | Feistel | 380/262 |
| 4,333,090 A | * 6/1982 | Hirsch | 380/52 |
| 4,479,112 A | * 10/1984 | Hirsch | 380/52 |
| 4,675,477 A | * 6/1987 | Thornwall | 380/267 |
| 5,754,652 A | * 5/1998 | Wilfong | 713/183 |
| 5,796,832 A | * 8/1998 | Kawan | 705/65 |
| 6,002,769 A | * 12/1999 | McGough | 380/28 |
| 6,058,189 A | * 5/2000 | McGough | 380/28 |

* cited by examiner

Primary Examiner—Gilberto Barron
Assistant Examiner—Kambiz Zand
(74) Attorney, Agent, or Firm—Mayer Fortkort & Williams, PC; Michael P. Fortkort, Esq.

(57) ABSTRACT

A secure electronic digital streaming system provides absolute system security and user-defined message security for electronic digital streaming between two public entities. These digital streams can be of any kind provided the contents are created using binary (0 or 1) bits; the unique and total possible combinations of which will be defined in a master alphabet of 64 6-bit combinations. The system encrypts and decrypts source digital stream data using a series of message keys that are derived from a private, numeric original key known only by both parties sending and receiving streams. The message key suite absolutely secures the original key from discovery. The system translates digital stream content binary bits into numbers based on a message key suite dependent distribution of the master bit alphabet and then uses the related patent mathematics to encrypt the numbers. The formulas return every possible number value, except the input value, and are completely dependent on the message key suite. Because there are no hidden parts, the architecture of the system is completely available to anyone in the public sector. This openness makes attempting stream decryption worthless. The system also has an automatic electronic capability to exchange original keys that cannot be mathematically nor cryptographically determined as new key messages.

48 Claims, 3 Drawing Sheets

METHOD AND SYSTEM FOR PERFORMING SECURE ELECTRONIC DIGITAL STREAMING

RELATED APPLICATIONS

The present invention relates to two existing patent applications, one for performing secure electronic monetary transactions and the other for performing secure electronic messaging. The first related patent application is U.S. patent application Ser. No. 08/879,708 filed on Jun. 20, 1997 by the same inventor, entitled "Method and System for Performing Secure Electronic Monetary Transactions," which is hereby incorporated by reference in its entirety, including the drawings, as if repeated herein. The second related patent application is U.S. patent application Ser. No. 08/923,095 filed on Sep. 4, 1997 by the same inventor, entitled "Method and System for Performing Secure Electronic Messaging," which is hereby incorporated by reference in its entirety, including the drawings, as if repeated herein.

BACKGROUND OF THE INVENTION

The present invention relates generally to methods and systems for performing secure electronic digital streaming, and more particularly, to a method and system for performing secure electronic digital streaming between two public entities for any binary bit based communication, e.g. any electronic communication that consists of binary bits represented as either a zero (0) or a one (1).

Securing a digital stream transfer between two public entities can be done in a variety of ways. But no matter the manner chosen, the goal is to positively transfer the stream contents through the public sector without the original configuration of the binary bits being discovered and used or read by anyone other than the intended recipient. This need for positive and secure digital streaming increases significantly along with the value of the information being passed. Various systems have been developed to perform secure streaming and the public record is well documented with both success and failure. The major component of almost every system developed is an encryption key that is used to translate information from a source bit to a cipher bit and back to the source bit.

A digital stream content key is just like a physical one—it is used to unlock, in this case secure data. All modern secure systems use keys of one type or another. The only difference between a streaming key and a physical one is that besides losing it or having it stolen, it can also be derived ("broken") or discovered. The major weakness with public transfer of information is key discovery. Not the physical issues with loss or theft, which are faults that cannot be removed from any key-based system, but deriving and using a key without authorization.

The current electronic age has ushered in a dramatic increase in the need for secure digital streaming, and methodologies have been developed to attempt to meet the demand. Existing secure digital streaming systems include private and public key encryption systems. The private key types of systems rely on creating multiple round permutations (substitutions, shifts, XORS, etc.) of the binary bits in a key-based fashion that without mathematical proof supposedly yields security. The public key types of systems are those using sufficiently large keys for "back-door" functions that rely on the time differential between deciphering the code by attempting the "hard" portion of the problem and deciphering the code with the known private key. The majority of digital streaming systems includes the secret or private key systems.

A private key system is one in which only those who intend to share information will all posses the same key. The private key systems are ideal for bit encryption because the application of digital streaming technologies is generally used by devices (either hardware or firmware) or software systems that share the electronic language between themselves.

The limited set of possible values (either 0 or 1) for the source and cipher bits have resulted in most bit encryption technologies using a series of key based permutations (substitutions, shifts, XORs, etc.) that supposedly lead to reliance on the knowledge of the key to decrypt a communication. Almost all of these systems cannot mathematically prove that the permutation series does not have any short cuts, and some result in large blocks of what are called "weak keys"—keys that when used, result in ciphertext that can be quickly broken.

A major problem with these private key systems is that the number of permutations that must be performed makes the systems inherently slow. For every additional machine operation that must be performed, not only are there possible attack points for deciphering the key or the plaintext, but the performance suffers. These two different, opposing objectives of most streaming encryption algorithms leads to a compromise between the obscuring of a two state bit and permuting it the least possible number of times.

The public key systems are based on a concept called Public Key Encryption (PKE). These systems were developed to solve the supposed faults of the private key methods. PKE introduced a concept in which there are dual keys—one public and one private. The public key is freely distributed to anyone who wishes to transfer information to the entity holding the single private key. This dual key approach therefore solves the fault by not having to distribute a private key. The entire basis for PKE methods are the mathematically large disparity between decrypting the public key created cipher text with the PKE private key, which is very rapid and simple to do (polynomial time computation), and working through the possibilities without the key, which theoretically takes a very long time (factoring, requiring exponential time computation).

The systems are theoretically secure because the combination of the public key and the source information generate this theoretically long time to factor the possibilities without the PKE private key. The reason this is theoretical is that it is possible to develop a unique set of mathematical equations or even a single algorithm for either mimicking or rapidly factoring an integer in polynomial time, although no solution has been published to date. Alternatively, faster computers are always shortening the problem. Proposals have even been made to develop "quantum computers" that would perform these computations in a fraction of the expected time. Consequently, the controversial issue with these methods is that if the math were to be developed, or the shortcut found, then the security of these PKE systems completely and instantly evaporates.

In relation to securing bit-based message contents, the current systems have three major flaws, whether public or private key:

1. The mathematics of the systems cannot be demonstrably proven to be secure; e.g., message decryption is not solely dependent on "brute force" attempts of every possible key combination;
2. The derivation of a single message key reveals the private key for all messages sent using that key, e.g., once the key is discovered, and the discovery kept secret, all the multiple messages sent with that key can be broken and read;

3. As the number of machine operations per bit increases, the performance and use of the system in any intended public arena either adds cost or inconvenience or both, all the while not necessarily adding any proven increase in security;

Additionally, the private key systems:

Do not provide for any means to securely send new keys as part of the system's capability, e.g., secret key systems must rely on a different message channel to securely distribute the keys, and the current secret key systems must continually rely on the availability and security of this channel to exchange new keys.

Also, the public key systems:

Do not account for the single most important factor in secure streaming—authentication, of both the message's sender and the content condition (touched/untouched); e.g., the major benefit of using PKE is to not have any concern for the public distribution of the keys. Yet because the system cannot in and of itself perform any authentication (all send using the same public key), secure streaming using these systems then requires the additional use of another external system to perform the authentication which completely negates the use of PKE for secure streaming.

The present invention is therefore directed to the problem of developing a system for performing secure digital bit streaming that is not reliant on complicated mathematics or permutations that can negate key attempts, separates key discovery from message discovery making even key attempts valueless, provides a bit translation as opposed to a permutation that occurs in a single operation for encryption and one for decryption, provides for the ability to send new key messages that are mathematically indistinguishable as new key messages and indecipherable without the original key even if recognized, provides for embedded authentication and non-repudiation by virtue of the secret keys, and that uses an architecture that is completely open and which places no technology or expert knowledge obligation on the system users.

SUMMARY OF THE INVENTION

The present invention solves these problems by providing a secure digital streaming system that employs the fundamental mathematics of the related Secure Electronic Monetary Transaction System (SEMTS) invention and the alphabet and key matrix representation of the related Secure Electronic Messaging System (SEMS) in a new series of simple mathematics and either hardware, firmware or software processes that create an individual and unique, twice-derived variable length Base 9 numeric message key; a key-based offset for the 6 bit segment alphabet resolution (as a block cipher) or a random number based ordering for the 6 bit alphabet resolution (as a stream cipher); a key-based insert of random message content obscuring bits, an optional numeric "digital signature" for authentication of any n bit message content and sender verification, and a fully secure automated new key exchange capability—all from a single, securely distributed "original" numeric key that is impossible to obtain or derive through decryption—of a single, or set, of messages.

The present invention enables secure electronic digital streaming using a private numeric encryption key system identical to that of the monetary and messaging systems. The mathematics and processes of the digital system use the fundamental capability of both the monetary system and the messaging system, but in distinct and separate manners maintaining the absolute security of the key.

To decode a particular message, one must know the alphabet offset or random order, the random content offset, and the twice-derived variable length Base 9 numeric message key used to encode the content; these are all derived from an "original" securely distributed key that cannot be obtained from the message. Therefore, in order to "break" anything in the system, the only method available is a "brute force" attack on a single variable length key encrypted message stream. Other systematic attacks, such as differential cryptanalysis or linear cryptanalysis all rely on either multiple samples of known plaintext passed through the key or a statistical sample of general plaintext through the key types. The system negates all of these multiple plaintext attack types due to the "perfect forward secrecy" capability of uniquely encrypting every individual message.

A brute-force attack would reveal, after an extremely long time period, that singular derived message key and the contents only—assuming that one attempts all the possible variable key lengths and combinations per length, and that one also has a basis for the digital bit stream in the first place; e.g., if one intercepts a digital message that is sent from a cellular phone, one needs to have some kind of statistical basis for the spoken words that are translated into a digital stream, and then encrypted. Because the system encrypts each message uniquely, the statistical basis for the translated digital stream can only be guessed not determined (the sample size is always only one message); so the likelihood of having any key attempt actually yield the true plaintext requires every attempt to be resource intensive and to compute not only the believed digital stream, but also to then read the stream in its plaintext mode (in this example, as a voice), to determine if the attempted key is the correct key. All other messages sent by the system using that original key are still one hundred percent secure and appear to any decryption effort as completely unique variable length key messages.

The system can be set so that the derived variable length message key is of sufficient length to always guarantee a minimal "brute-force" attack time length to be measured in years—no matter the current technology; and the system guarantees that any "brute-force" attack will deliver only the derived message key, not the original key, and hence, only the content of the individual target message. The system guarantees a mathematical and process impossibility of ever discovering or deriving the original key from the message key, therefore making the only attack point of the system of no value.

The system of the present invention uses the SEMTS invention's general mathematical formula and software code processes, and the SEMS invention's alphabet and key matrix representation capability and software code processes along with new software code processes and one simple addition formula to accomplish encryption and decryption of any binary bit stream message of any content length.

In order to use the system, step one is to establish the absolute length of the private numeric original key to be shared between the two public message entities. This length should be substantial enough to generate as true a random set of numbers for the key as manageable under the planned use by the two entities. There is no system minimal length, but it should be at least enough digits so that attempting all keys is unreasonable. This is the "user-defined" value for determining the minimum "brute-force" attack period.

(An example of this is that if the current technology can generate an average attack test scenario of one billion keys per second against a particular message, and the requirements of the system are to have the minimal average "break" time of two years for any one message, then the "original" key length should be set at 18 numeric Base 9 characters. This is because there would be approximately $3.15 \times 10^{16}$ attempts in a year; and if on average a message is "broken" after 50% of the keys are attempted, the goal would be to have the message contain approximately $1 \times 10^{17}$ key possibilities. And using this present inventions system, that would be an "original" key of 18 Base 9 digits; because using this system, the original key produces a message key equal to its length; therefore the resulting derived message key from an 18 digit original Base 9 key would be 18 digits long also, producing $1 \times 9^{18}$ possible keys, which is roughly equivalent to $1 \times 10^{17}$.

This quick example uses the absolute key lengths; but in application, the system can be implemented using variable key lengths. Variable key lengths produce much longer brute-force attempt scenarios, because the attempts must include the "up to" key lengths. This means that if the derived message key length is 18 digits as in our example above, and the system is implemented with the variable lengths of from 10 up to 18 digits, the actual attempted keys would be $1 \times 9^{10} + 1 \times 9^{11} + 1 \times 9^{12} + \ldots 1 \times 9^{18}$ keys—a value substantially longer just the $1 \times 9^{18}$ absolute key attempts. The system's variable length capability reinforces the worthlessness of the only cryptographic attack point.)

The next step is secure external distribution of the initial, original Base 9 keys. Finally, the system of the present invention can be used to send content bit streams between the parties based on these distributed original keys.

The present invention provides a completely open messaging architecture between two public entities to accommodate and incorporate the true dynamics and purpose of secure digital streaming. The purpose is not to absolutely secure any n bits—if it were, then use a secure channel, not an open digital stream. The purpose and value of secure streaming is in the system as a whole; in using a system that delivers group message security that is unbreakable, and singular n bit message security that is predictable and makes for an unreasonable effort to obtain and attack it.

No system to date has met the real goal of secure streaming: to make captured or stolen content messages have no value—they can only be derived from a "brute-force" key attack of impossibly long expenditures of time and effort which would then reveal only that n bit content, not any others. The present invention meets that goal.

In addition, the present invention uses the related SEMTS simple mathematical foundation that provides confidence and straightforward comprehension of the method. The additional mathematics in the present invention is the addition of two single digit Base 9 numbers, and the representation of the result as a translated 6 bit value.

The system also delivers message content and sender authentication as an embedded capability, along with a new key distribution process that is mathematically indeterminate if the initial, original key has been securely distributed. The system also provides a performance optimization that cannot be further refined or bettered; the bit translation is accomplished in a single-step calculation, instead of most current system's multiple round, performance degrading, permutations. Finally, the present invention makes the system small and self-contained so that it can be delivered easily to any institution wishing to incorporate the system into their streaming technologies.

DETAILED DESCRIPTION

Figure 1:
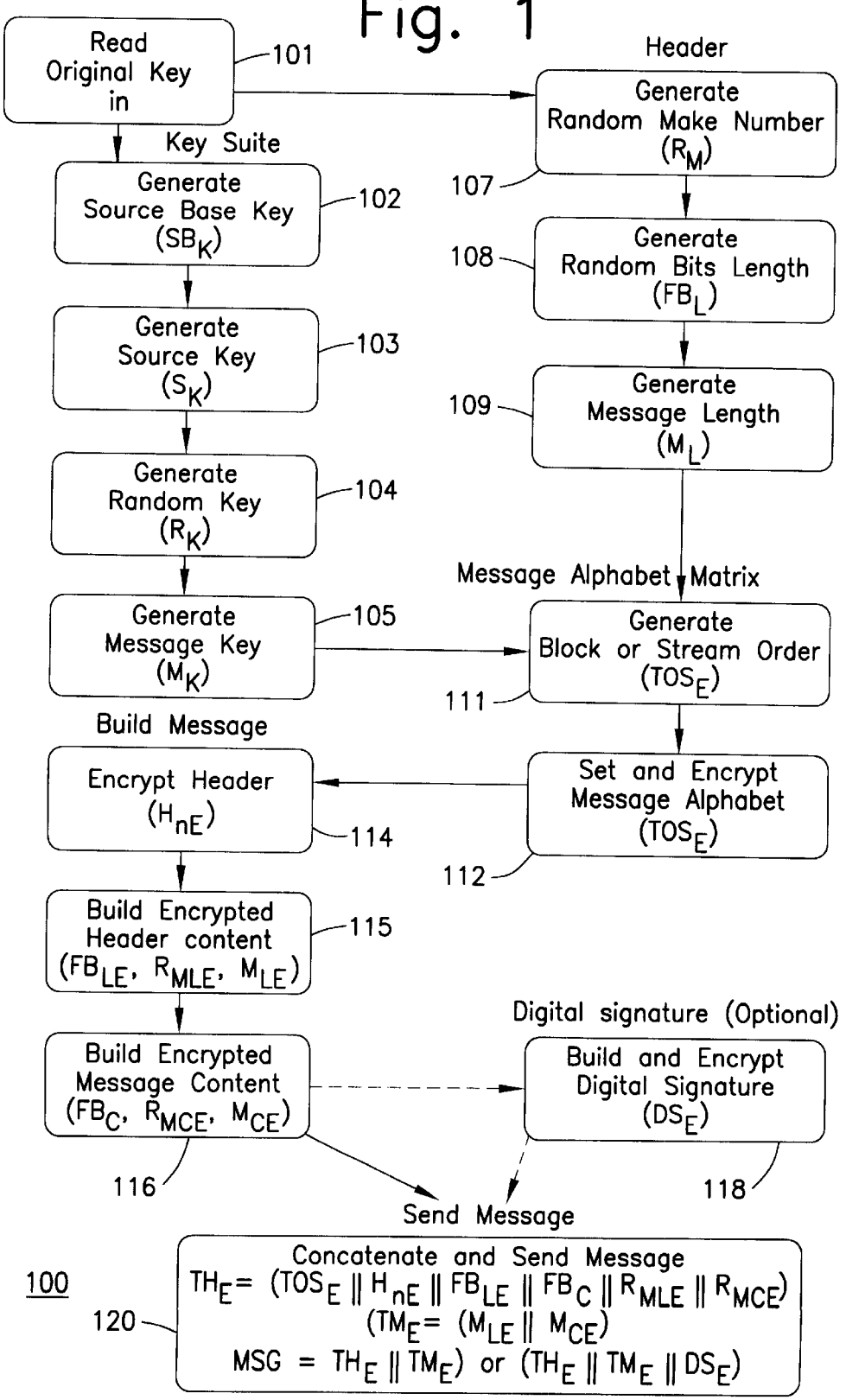
FIG. 1 depicts one exemplary embodiment of a method for encrypting a message according to the present invention.

In order to uncover a system of truly unique and complete secure streaming, it is crucial to understand and accept a single concept: all encrypted language-based streaming messages can eventually be revealed without knowing the key system used to secure it or anything about the content structure and composition. This is due to the inherent nature of streaming message contents: a two-state bit. No matter the system or the key, cryptologically, it will eventually always reveal itself and therefore the message, because the content is nothing more than a two-state bit (0 or 1). If enough time and effort is expended in attempting every possible key set or every possible bit combination, eventually the message will be revealed.

The real goal then, of a completely secure streaming system is not to guarantee every single message's encrypted integrity, but rather to guarantee all messages are secure. The measure of a secure streaming system is to deliver each message as if it were individually encrypted so that the system cannot be attacked, and for each individual encrypted message to be so difficult to decipher as to make it a completely worthless endeavor to try.

Understanding the concept and goals of a secure streaming system is paramount to meeting the major goal of encryption—making key derivation impossible. So in combining the purpose of securing messages with the goal of encryption, the best possible outcome of a secure streaming system is to provide an impossible to derive system or original key, and an individual message key that can be broken only by applying a tremendous amount of time and effort through exhaustive key search ("brute-force") attacks, and then having the message key not lead to the original key. All other cryptographic techniques (linear or differential cryptanalysis, etc.), mathematical application or any other "method" of key determination simply does not work other than trying all the keys. The present invention is the first secure streaming system to deliver on this "best of breed" scenario.

And because it is the first system that has combined both aspects of authentication, sender and content, the present invention delivers on another crucial secure electronic streaming criteria—an open architecture. An open architecture delivers the system value directly to the user. There is no fear in using a system that can be stolen but never is because the stolen goods have no value. The openness of the system creates user confidence and allows the focus of the system to be in the physical aspects—key distribution, key theft, software authentication, etc. These are the constants in any secure streaming system, and the present invention finally transfers the burden of absolute security from the messages themselves back to physically operating the system.

The secure electronic digital streaming system (SEDSS) of the present invention is designed to deliver complete, open architecture secure streaming through unbreakable original symmetric keys that produce an individual, unique message key for every message sent. The system uses private keys and the mathematics of the Secure Electronic Monetary Transaction System (SEMTS)—a separate patent application (which has been incorporated by reference) for securing any n digit financial transaction. The system also uses the matrix alphabet and key representation of the Secure Electronic Messaging System (SEMS)—a separate patent application (which has been incorporated by reference) for securing general alphabet messaging. The original keys ($O_K$) used for the current system are like those in the SEMTS, except that they are composed of numbers 0 through 8 (Base 9 numbers), have a minimum and maximum length determined by the two public entities using the system; an example original key is "4730146825."

In order to send a secure message using the SEDSS, the first process for every message, which is not a part of this patent application, is to generate three random values unique to this digital stream. The first of these is a random Base 9 number that is up to the length of the original key, the maximum length, and greater than the system defined minimum length. [There are several fine software algorithms for generating "true" random number sets. Even if these are not used, a simple algorithm, such as taking a repetitive, changeable sample from the division result of the number one and a large prime number (e.g., 1/213), is still more than sufficient to produce a random enough number for the remainder of this invention's processes—this number does not need to approach "true" random in order to protect the number of "brute-force" key attempts.] This number, the message Random Make number ($R_m$), is used to determine the length of the key suite that will be generated for this stream. It is also used to determine other number pairings during the key suite generation.

The second randomly generated value will be the number of False Bits ($FB_C$) to be placed at the beginning of the encrypted stream. This number will also be between two system-defined values for the minimum number and the maximum number of bits.

The third random number generated will be the total number of bits to be encrypted (not counting the just determined $R_M$ and the $FB_C$), e.g., the Message Length ($M_L$). This number will fall between the final system parameter pair of a minimum and maximum number of message bits.

The second process of the SEDSS is to encrypt the message to be sent. This process includes various sub-processes, the first of which is translating the $O_K$ original key into a Message Key ($M_K$) for every message to be sent. The key derivation process includes three intermediate keys; the Source Base Key ($SB_K$), the Source Key ($S_K$), the Random Key ($R_K$), and finally, the Message Key ($M_K$). These keys are all derived from the original key, and they all use the one single SEMTS formula that mathematically guarantees that any one key cannot lead to "reverse" discovery of the original key.

The only way to generate any particular message key without the original key is an exhaustive key search (brute force attack) on that individual message. It must be remembered that by using this invention, the system would be set so that the brute force attack on this singular message key is a meaningless endeavor. The SEDSS encrypt process delivers absolute security of the original key by translating it into a message key. The SEMTS formula is:

$$(x+y) MOD(9)=n$$

where x and y are two inputs known only to the SEDSS system (changing as per placement in the process) and the result, n, is either an intermediate unknown passed to the continuing process, or is a public, known value as the SEDSS encryption output ciphertext. This formula is mathematically impossible to solve for the two unknown values.

The key suite generation is a set of SEMTS formulas. The first key in the suite, the Source Base key, $SB_K$, is a "static" key, the same for every original key. It is formed by combining pairs of digits of the original key. The digit pairs for this first "static" key derivation are selected in order of appearance in the original key, and the resulting "base" Source Key is one half the original key length. The $SB_K$ is a derived static message key generated by always using the same digit order from the Original Key—digit one with digit two, digit 3 with digit 4, etc. This $SB_K$ is therefore static, and always the same for the same associated original key. The formula used to combine the digit pairs is $$(O_{Kn}+O_{Kn+1}) MOD9=SB_{Kn}$$

where $SB_K$ is a static key per $O_K$, and n starts equal to 1, and ends at ($O_K$ digit length−1)

This key is used to encrypt, absolutely, any sent configuration items (e.g., the random make number, the number of false bits, the message length in bits, etc.) in the digital stream, and since the equation ($SB_{Kn}$+ConfigItemDigit$_x$) MOD9=n cannot be solved for any known (ciphertext output) n with two unknowns ($SB_{Kn}$ and ConfigItemDigit$_x$) the SEDSS configuration items are indecipherable. [It is noted that even if the items are sent publicly, without $SB_K$ encryption, the message is still indecipherable without the $M_K$, Message Key. It simply would mean that brute force key attempts may be tried without all the message format permutations, which are considerable.]

The remainder of the key suite generation is particular to every message, which makes the SEDSS the first encryption system to deliver true Perfect Forward Secrecy—a new, unique key for every message sent in a single delivery. The other formulas are:

$$(O_K+R_M) MOD9=S_K$$
$$(S_K+R_M) MOD9=R_K$$
$$(R_K+S_K) MOD9=M_K$$

One can see that the only known value in this set of equations would be the $R_M$, but this is one of the configuration items sent absolutely encrypted by the $SB_K$. Even with the $R_M$ sent publicly, there are three equations, and four unknowns ($O_K$, $S_K$, $R_K$, $M_K$). This is mathematically impossible to solve, and guarantees the SEDSS key suite generation is unbreakable; with the $R_M$ sent absolutely indecipherable, the brute force attacks on the $M_K$ are worthless in that a single discovered message key does not lead back to the original key—there are still four unknowns in three equations ($O_K$, $S_K$, $R_K$, $R_M$).

The formulas described above are used in the key creation sub-process of the encrypt process. The first key is the Source Base Key, the $SB_K$. From the same example original key above, "4730146825", the $SB_K$ would be "23557". This key is used to encrypt other numeric parts of the SEDSS message, and not as a part of the remainder of the key suite generation—which does change for every single message sent. The use of the $SB_K$ is perfect for the other numeric configuration items' encryption because of the mathematical impossibility of ever determining the $SB_K$ or of even using a somehow known $SB_K$ to reconstruct the original key. This is impossible due to the SEMTS modulus arithmetic formula which includes 9 possible number pairs as the input to any known single digit output.

The key creation sub-process continues by applying the Random Make Number ($R_M$) to the original key to produce another source key, a randomly created and uniquely different Source Key ($S_K$) that is the same length as the $R_M$. From the same example original key, "4730146825", a possible source key would be "833102828" when using a generated $R_M$ of "450187236". This is determined by (4+4)MOD9=8, then (7+5)MOD9=3, and (3+0)MOD9=3, and continuing through the $O_K$ using the digits of the $R_M$ until all of the digits in the $R_M$ are used—which in this case is one digit less than the Original Key length.

The length of the resulting $S_K$ is identical to the length of the generated $R_M$. Since the length setting of the $R_M$ can vary between the minimum system setting and the maximum $O_K$ system set length, and because the final, individual message key ($M_K$) that results is the same length as the $R_M$ also, it becomes apparent that each individual $M_K$ has a variable length.

One of the great encryption strengths of the SEDSS is that the "period" of this individual, varying Message Key then becomes a progressive number. The "period" of any cipher is the number of possible key attempts in an exhaustive key search. The larger this number, the better. One of the major new capabilities of the SEDSS is that the period of the cipher is extended without extending the key size by enabling each key to be up to a certain value; as opposed to being limited to an exact value.

For example, if the published key size for a particular encryption algorithm is 50 digits long, then the period of that cipher is $10^{50}$—which is the number of possible 50 digit keys. Using the SEDSS variable length key methodology, the period of an identical 50 digit Message Key would be up to and including $9^{50}$; or $9^{50}+9^{49}+9^{48}+9^{47}+\ldots+9^1$. This number is significantly longer than simply $9^{50}$. The SEDSS variable length keys mean immeasurably more security than any existing capability. (It is noted that a key length of 1 ($9^1$) is not very secure, so any SEDSS implementation would have a minimum value, such as $9^{20}$.)

Now that the original numeric key has been translated into a source numeric key, the next part of the key creation process is to generate a Base 9 Random Key ($R_K$). This random key is created by using the SEMTS above listed formula and combining the just generated $S_K$ and the $R_M$ again. Continuing the example, the combination of the $S_K$ of "833102828" and the $R_M$ of "450187236" results in an $R_K$ of "383280155", using (8+4)MOD9=3, (3+5)MOD9=8, continuing through the entire $S_K$ and $R_M$ matching digit for digit. The resulting $R_K$ is identical in length to the $S_K$ and $R_M$, and like the $S_K$, is an intermediate key used only to separate and absolutely secure the message Message Key from the Original Key.

After successfully cycling through the $S_K$ for the complete generation of the $R_K$ then the encrypt process continues with the creation of the $M_K$ message key. This final key is created using the SEMTS formula with the just generated $R_K$ and $S_K$ keys as inputs. Using the $R_K$ of "383280155" and the $S_K$ of "833102828", the resulting $M_K$ will be "226382074". This is calculated by (3+8)MOD9=2, (8+3)MOD9 2, (3+3)MOD9= 6, continuing through all the digits of the $R_K$ and the $S_K$. The $M_K$ message key is now twice removed from the $O_K$ original key and is of a variable length.

The next sub-process of the encryption process for sending a secure digital stream using the SEDSS is to place the digital bit alphabet into its Segment Matrix. Using the matrix alphabet representation of the SEMS, the SEDSS creates the sixty-four (64 or $2^6$) unique bit combinations of six (6) binary bit blocks as an alphabet. These 64 unique 6 bit blocks are then placed into an 8×8 Segment Matrix, with each of the 64 possible combinations in a unique matrix position. There are 64 possible combinations of a 6-bit block, beginning with 000000 (representing 0) and ending with 111111 (representing 63). Each 6-bit block represents a number between 0 and 63. These 6 bit combinations are the SEDSS segment matrix alphabet. The following is the matrix by position:

Segment Matrix by Position

| Row | Column | | | | | | | |
|---|---|---|---|---|---|---|---|---|
| | 1 | 2 | 3 | 4 | 5 | 6 | 7 | 8 |
| | | | | Position | | | | |
| 1 | 1 | 2 | 3 | 4 | 5 | 6 | 7 | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |
| 8 | 57 | 58 | 59 | 60 | 61 | 62 | 63 | 64 |

The Segment Matrix bit alphabet distribution has two options. One is for a fixed distribution of the bits; the second is for a random distribution of the bits. Both are determined by a Type Order Signature (TOS) sent at the start of each stream. The first option is called a block cipher (or block matrix) distribution, in which the bit alphabet is randomly distributed, but always read in the same random order, e.g., the first 6 bit alphabet "letter" is 011011 and the second might be 111011, the third 101010 and the fourth 111111, etc. These are always read as belonging to the same position.

The block matrix distribution can also have a variant in that for the entire streaming system (all parties sending/receiving), the order in which the bit block "letters" appears is fixed, but the position in the matrix can move. This adds even more difficulty to the brute-force attempts, in that now for every key attempt, there will be a minimum of 64 different bit alphabets to try (the fixed order starting in position 1, then in position 2, etc.).

The second option is called a stream cipher where the distribution of the bit alphabet is randomly distributed based on the TOS sent with each message; e.g., the matrix is re-positioned by the signature for the upcoming stream. The stream is decrypted, and the bits are placed into the matrix starting at the first position and filled in order—but the bits are random and unique each time. The next stream would again rearrange the matrix to read it uniquely when using this stream cipher option. Using this option, there are 64 factorial (64*63*62*61 . . . *1) possible alphabets for every key attempt. Even if both the block or stream orders are known (which is mathematically impossible, but . . . ), there is no cryptographic advantage—deciphering the message still entails an exhaustive key search for every message key.

The following is a sample order pattern of a filled matrix (The numbers in parentheses after each 6 bit block "letter" is the number represented by the 6 bit combination. The numbers in brackets are the position):

| EXAMPLE BIT ALPHABET ORDER SEGMENT MATRIX | | | | | | | | |
|---|---|---|---|---|---|---|---|---|
| Column | | | | Position | | | | |
| Row | 1 | 2 | 3 | 4 | 5 | 6 | 7 | 8 |
| 1 | 101011 (53) [1] | 101000 (5) [2] | 110010 (19) [3] | 110110 (27) [4] | 001111 (60) [5] | 011101 (46) [6] | 110001 (35) [7] | 000110 (24) [8] |
| 2 | 011000 (6) [9] | 001001 (36) [10] | 101111 (61) [11] | 101101 (45) [12] | 001100 (12) [13] | 010010 (18) [14] | 111111 (63) [15] | 010111 (58) [16] |
| 3 | 001101 (44) [17] | 011011 (54) [18] | 001000 (4) [19] | 100101 (41) [20] | 110011 (51) [21] | 100001 (33) [22] | 010011 (50) [23] | 011100 (14) [24] |
| 4 | 100000 (1) [25] | 101110 (29) [26] | 101001 (37) [27] | 111000 (7) [28] | 101100 (13) [29] | 000011 (48) [30] | 110100 (11) [31] | 100010 (17) [32] |
| 5 | 101010 (21) [33] | 001010 (20) [34] | 000000 (0) [35] | 111110 (31) [36] | 111001 (39) [37] | 010110 (26) [38] | 100110 (25) [39] | 100011 (49) [40] |
| 6 | 111011 (55) [41] | 001110 (28) [42] | 000010 (16) [43] | 011010 (22) [44] | 110111 (59) [45] | 000101 (40) [46] | 010100 (10) [47] | 011111 (62) [48] |
| 7 | 110101 (43) [49] | 010101 (42) [50] | 011110 (30) [51] | 011001 (38) [52] | 000001 (32) [53] | 111101 (47) [54] | 010001 (34) [55] | 111100 (15) [56] |
| 8 | 010000 (2) [57] | 001011 (52) [58] | 110000 (3) [59] | 000111 (56) [60] | 111010 (23) [61] | 000100 (8) [62] | 100100 (9) [63] | 100111 (57) [64] |

For the block cipher option, this example fill pattern is used by all streaming participants. If the movable order pattern variant of the block cipher is used, then each stream will generate a unique placement of this static fill order for the bit alphabet based on the first two random digits sent in the 6 digit TOS (represented by an 18 bit block) at the message start. The resulting number will be the start position (Column and Row) of the Segment Matrix for that n bit message. If the stream cipher option is used, then a 64 two-digit TOS (represented by a 384 bit stream block) will be sent at the beginning of the message indicating the random order of the positions to be used for that stream.

The manner in which the stream TOS is sent is to use two digits for each of the 64 positions in a random order, "54320119 . . . " where the first position of the matrix becomes the bit representation of 54, the second becomes the 32, the third becomes the number one, the fourth becomes 19, etc. until the matrix is completely filled. This stream TOS is then encrypted by the $SB_K$ Source Base key and sent as the first 384 bits of each message.

For a block loaded matrix, there is a six digit random TOS sent at the beginning of each message, such as "543201". This random block TOS is made up of three numbers (2 digits each) from between 1 and 64. The reason there are three numbers is that the following Header information requires 6 digits in order to be properly and totally encrypted. If the block matrix movable order pattern option is used, then the first two digits of the TOS will be the starting position for the pre-defined bit block order fill. Using the "543201" signature, then the block fill would begin with the fifth column and fourth row, and then continue up the columns and rows, wrapping back around to the first column and row.

In actuality, the stream or block TOS is sent by taking the first digit of the first number ("5" from the 54), and SEMTS encrypting it using the Source Base Key, $SB_K$. If the first digit of the $SB_K$ were an "8" for example, the encrypted result would be "4", using the SEMTS formula modified for this SEDSS to Base 9:

$(SB_K + SO_X) \text{ MOD}9 = n$ where n cannot equal zero and $SO_X$ is the Stream (or Block) Order digit.

If either the $SB_K$ digit is zero, or the result is zero, then the $SB_K$ digit is skipped and the next one is used. The result of the first two TOS digits, $SB_K$ encrypted, are then used as a "Column, Row" lookup into the position matrix. If an example second digit encrypted result were a "7" (using the "4" from the 54, and a $SB_K$ example key digit of "3"), then the lookup into the position matrix is a "Column, Row" (C, R) pair [4,7] which is the $52^{nd}$ position. The bits that are then returned as the first 6 of the TOS are "001011", which is "52".

The decryption process upon receipt of the 384 bit stream TOS or 18 bit block TOS is the reverse. The "52" is read into the position matrix to return the C, R pair of [4,7], which is then single digit decrypted using the "reverse" SEMTS Base 9 formula:

$$((9+n)-b))MOD9=a$$

where n is the ciphertext value and b is the known key digit and the result a is the message plaintext. The $SB_K$ digit and result rules remain in effect.

So far in the SEDSS encrypt process, the random make number has been generated, all of the message key values have been created, and the bit alphabet is either block or stream distributed into the Segment Matrix, based on the Type Order Signature, TOS of either 384 or 18 bits (determining which will be sent is system defined for all messages, although it could be accomplished with an on/off block sent as the first 6 bits in which the decrypted values of 1–4 represent a block matrix fill, and 5–8 a stream order fill).

The next sub-process of the encrypt process is to create and insert the Header. The Header is a small 18 bit section used to set encrypted values that will determine individual configuration of the remaining sections of the message.

The Header is comprised of three 6 bit blocks that will be used to unlock the remaining message contents. The SEDSS, has the unique and revolutionary capability to send each individual message stream with a variable key length, a pre-set number of bits, and embedded false bits to further complicate a brute force key attack. The Header section:

1st 6 bit block ($H_1$)=# of digits in the $R_M$ representation (determines key length)

2nd 6 bit block ($H_2$)=# of digits in the embedded false bits representation (determines message start)

3rd 6 bit block ($H_3$)=# of digits in the message length representation (determines message length)

Using an example Alphabet Order Segment Matrix of:

| Row | Column | | | | |
|---|---|---|---|---|---|
| | 1 | 2 | 3 Position | ... | 8 |
| 1 | 010010 (1) | 110110 (2) | 101010 (3) | ... | 101111 (8) |
| 2 | 001111 (9) | 101011 (10) | 011100 (11) | ... | 100001 (16) |
| ... | ... | ... | ... | ... | ... |
| 8 | 001001 (57) | 100011 (58) | 000011 (59) | ... | 000111 (64) | where the numbers in parenthesis indicate the static position number of the segment, an example Header could be:

110110 000011 100001 (The spaces are for emphasis) These 6 bit blocks represent Matrix segments (2,1) (3,8) (8,2)

The manner in which these bits are determined (using $H_1$ as the example): For $H_1$, if the $R_M$ is 60, this representation is two digits long The SEMTS formula for encrypting the 02 (always send two digits, using 0 if required):

$$(((SB_K+SOD_C)MOD9)+H_{1X})MOD9=C_E$$

where $SOD_C$ is the TOS Column (1st digit of stream) and $H_{1X}$ is the $H_1$ first digit $$(((SB_K+SOD_R)MOD9)+H_{1X})MOD9=R_E$$

where $SOD_R$ is the TOS Row (2nd digit of stream) and $H_{1X}$ is the $H_1$ second digit Both of these formulas have the restriction that the $(SB_K+SOD_n)$ MOD9 result cannot be equal to zero; the restriction is not on either digit, just the result. These two SEMTS formulae return a $C_E,R_E$ from which the position bits are returned (110110 in the example above from the $C_E,R_E$ of 2,1)

The decryption formulas for reading the bits after decrypting the matrix alphabet are:

$$(((9+C_E)-(SB_K+SOD_C)MOD9)MOD9=H_{1C}$$

$$(((9+R_E)-(SB_K+SOD_R)MOD9)MOD9=H_{1R}$$

The rule for the Header values is that the digit length, and hence the resulting $H_{1X}$ value to send, cannot be a 9 because of the SEDSS Base 9 restriction; nor can it be longer than two digits. The two digit length restriction only means that the represented digit length of any of the three sections cannot be longer than 88 digits. This restriction is not a problem because not even the message length would be $1 \times 10^{87}$ bits long.

For the restriction of the number 9 entry, this is not really an issue with regards to the $R_M$ length; as a 9 digit number would be a key length in excess of 100 million digits (100,000,000); anything longer would be even more absurd. For the message length, the 9 entry restriction impacts the length at 100–999 MBs, 19 digits ($1 \times 10^{12}$ MB's), 29 digits ($1 \times 10^{22}$ MB's), etc. The only issue would be the 9 digit entry of 100–999 MBs. For the number of false bits, the entry restriction shouldn't be an issue as sending 100 MBs of false bits would be excessive from a performance standpoint.

The security of the Header is 100% unbreakable and left to guesswork due to the fact that the SEMTS algorithm inputs cannot be determined; even in the case of the first digit of the $R_M$ which would almost always be a zero, the discovery of $0+(x+y)MOD9=n$ with a known n cannot yield either x or y which are the Key and Stream values. Also knowing that the $R_M$ length is most often two digits long does not help to "break" the remaining message contents, because of the following message configuration and the same SEMTS numeric encryption.

The remaining message body is comprised of the configuration contents, the message contents, and optionally, there can be a digital signature (DS) to complete the message for additional authentication. The configuration contents (or Header Content) and message contents are interlaced to produce the message body. The Header Content (HC) is comprised of three "sections," as is the Message Content (MC). These are intertwined in the following manner. (The combination is simply a bit stream with each certain number of bits having a specific meaning and decryption value as either a part of the HC or the MC.)

$$FB_L||FB_C||R_{ML}||R_{MC}||MSG_L||MSG_C||DS$$

where the FB means False Bits, the $R_M$ is the Random Make Number, MSG is the message contents, and L and C stand for length and content respectively.

The random number of false 6 bit block "letters" are inserted into the message at the start so as to create a non-uniform distribution of the beginning of the message, and disrupt any "grammar" rules for finding meaningful bit patterns at the start of a stream; e.g., guessing that the start of every cellular communication is a digitally represented "Hello", would provide a statistical sample by which to attempt linear cryptanalysis (even though the sample set size is always only a single message because the SEDSS uniquely encrypts every message with a singular message key.) The false bits remove the linear cryptanalysis attack point, which is of no value due to the sample size of one anyway.

The manner in which all bits are streamed is that each 6 bit block of the length determines two digits of how many bits will follow in the content. E.g., if the number of False Bits is to be "2048", then the $H_3$ that represents the False Bits Length is "04", as the FBL number "2048" is four digits long. Each two digits of the $H_3$ is represented by a single 6 bit block; therefore the "04" would be represented in a single block.

The number of blocks in the length is the number of digits dictated by the Header divided by two, and rounded to the next number if a remainder. If there is an odd number of digits in the length, then the last Row number that is represented will be a 1; and upon decryption, this number is "discarded" as meaningless. E.g., if the number of False Bit Length digits is dictated by the $H_3$ header as three, then the $FB_L$ will be two 6 bit blocks, with the first block determining the first two digits, and the second block using the Column number as pertinent, and the Row number defaulting to 1. For example:

The number of False Bits is randomly selected to be 162 (this number can be divisible by 6 to make reading a standard "large" block of data match the product of computer word sizes (8 bits) and SEDSS block sizes (6 bits); e.g., for processing 48 or 72 or more "large" bit blocks at a time, then both the $FB_L$ and the $MSG_L$ should be divisible by either 6 minimally, or 24.) The Header section dictates a False Bit digit length of 03. The number of blocks that will be expected by the SEDSS in the $FB_L$ is then 3/2 rounded up to 2. The $FB_L$ is then the "1" and the "6" combined with the $SB_K$ to yield a $C_E,R_E$ that returns a 6 bit encrypted block; then the "2" and a default "1" are combined with the $SB_K$ to yield a second 6 bit encrypted block. The formulas used for each pair of digits:

$$(SB_K+FB_{LCX})MOD9=FB_{LCE}\text{(False Bits Length Column Encrypted)}$$

where $FB_{LCX}$ is the False Bits Length Column (x=1st digit)

$$(SB_K+FB_{LRX})MOD9=FB_{LRE}\text{(False Bits Length Row Encrypted)}$$

where $FB_{LRX}$ is the False Bits Length Row (x=2nd digit)

These two encrypted 6 bit blocks are then the encrypted $FB_L$. Then the $FB_C$ (contents) is 162 false bits that will be discarded upon decryption.

The next three "sections" of the message body (the $R_{ML}$, $R_{MC}$ and $MSG_L$) are all encrypted in exactly the same manner. The length values are dictated by the Header to know how many of the following blocks are pertinent to that section, with the same calculation of one expected block per every two digits, and rounded up for any remainder. The contents of the Random Make Number ($R_{MC}$) is a string of numbers just like the length definition and the message length definition. The length of the $R_M$ ($R_{ML}$) is how the SEDSS variable key lengths are determined.

The actual message contents, the $MSG_C$, is encrypted in a slightly different manner. The message contents is the plaintext bit stream that will be encrypted using either the stream or block bit matrix alphabet. As each 6 bit block is identified at a position in the matrix, that C,R pair is encrypted using the SEMTS algorithm that returns the $C_E$,$R_E$ pair. The $C_E$,$R_E$ pair is identified at a position in the matrix and returned as the encrypted bit stream. For every 6 bits in, there are 6 bits out. Should the message have a number of bits not divisible by 6, then the modulus bits will be padded with random bits to reach 6, and that last block will then be encrypted. Upon decryption, the random padded bits will be discarded as per the $MSG_L$ defined number of bits for the message. The formulas for encrypting a 6 bit matrix identified block are:

$$(M_K+MSG_{CX})MOD9=C_E$$

where $MSG_{CX}$ is the identified matrix Column position $$(M_K+MSG_{RX})MOD9=R_E$$

where $MSG_{RX}$ is the identified matrix Row position The $C_E$,$R_E$ identified matrix bits are then returned as the encrypted bits. E.g., if the plaintext block is identified as in matrix position [7,1] and using the $M_K$ to SEMTS encrypt it yields a $C_E$,$R_E$ of [3,8] then the matrix bits residing in that position are returned as the encrypted bit stream.

Decryption of the merged Header Content and Message Content sections is accomplished by using the general SEMTS "reverse" formula:

$$((9+n)-b))MOD9=a$$

where the n is the ciphertext value and b is the known key digit and the result a is the message plaintext The optional DS at the end of the message contents can either be an industry accepted hash result or an SEMS numeric checksum. Digital stream traffic, as encrypted by the SEMTS, most likely does not require a signature to aid in authentication, as the key structure is sufficient to validate the contents. A detailed description of the derivation, encryption and attachment of the DS is provided in U.S. patent application Ser. No. 08/923,095, which has been incorporated by reference.

The total message bit stream is now complete. The only number required for the recipient of the message to generate the same key set from the $O_K$ original key and then decrypt the contents, is the $R_M$ random make number. If one does not have the original key, the only way to decrypt the stream is to brute force attack the contents trying message key and false bit combinations. Even if successful, the only number obtained is the individual $M_K$ message key, which serves no further purpose beyond this one stream. The $R_M$ Random Make Number determines the $S_K$ source key, and the $R_K$ random key, and indirectly, the final message key, $M_K$—both the value and the length of these variable keys.

In using this SEMTS approach for translating all number keys into other number keys, it is simply impossible to derive one key from the other—there is no frame of reference for any of the source content numbers.

The SEDSS protects each stream with a unique Message Key, hides the start of the actual stream with a random false bit pattern that must be attempted for every key attempt, has the ability to use a completely unique "alphabet" for bit translation that adds exponential complexity to every key attempt and has the ability to send uninterrupted streams with new keys at any n bit interval. Without knowledge of the Original Key, there is no way to determine when one message stream has ended and the next begun; only an authorized SEDSS recipient can maintain the required decryption patterns.

The code logic for the Encrypt Message process of the present invention is:

```
MessageEncrypt
   Read Original Key in
      OK1=Digit #1 of key
      OK2=Digit #2 of key
      . . .
      OKn=Last Digit of key
   ! The next three values are determined for the Header
      . . .
   Generate Random Make Number
      ! R_M is the returned Random Make number between
         the system
      ! parameter minimum and maximum key numbers,
         and
      ! having a digit length not ending in 9
      Call Random(R_M)
   Generate False Bits Length
      ! FB_L is the returned number of False Bits between the
         system
      ! parameter minimum and maximum values, and
      ! having a digit length not ending in 9
      Call False(FB_L)
   Generate Message Length
      ! M_L is the returned Message Length in bits, between
         the system
      ! parameter minimum and maximum values, and
      ! having a digit length not ending in 9
      Call MsgLn(M_L)
   ! Now the key suite generation . . .
   Generate Source Base Key Number
      ! SB_K is returned
      ! The GetOkSB# function returns the two O_K digits to
         sum—in
      ! digit order pairs (1,2; 3,4; 5,6; etc.)
      ! SumKey function adds two digits together and returns
         a
      ! MOD(9) number
      set n=1
      loop
         Call GetOkSB#(Ok#1, Ok#2)
         Call SumKey(Ok#1, Ok#2, SB_Kn)
```

$SB_K = SB_K \| SB_K n$
set n=n+1
If $n > O_K$ keylength
　Break
Generate Source Key Number
　! OKn is passed, $R_M n$ is passed, $S_K n$ is returned
　! The GetOk# function returns the next $O_K$ and $R_M$ number
　SumKey function adds two digits together and returns a
　! MOD(9) number
　set n=1
　loop
　　Call GetOk#($R_M n$, Ok#)
　　Call SumKey($R_M n$, Ok#, $S_K n$)
　　$S_K = S_K \| S_K n$
　　set n=n+1
　　If $n > R_M$
　　　Break
Generate a $R_K$ Random Key
　! $S_K n$ is passed, $R_M n$ is passed, $R_K n$ is returned
　! SumKey function adds two digits together and returns a
　! MOD(9) number
　set n=1
　loop
　　Call SumKey($R_M n$, $S_K n$, $R_K n$)
　　$R_K = R_K \| R_K n$
　　set n=n+1
　　If $n > R_M$
　　　Break
Generate a $M_K$ Message Key
　! $S_K n$ is passed, $R_K n$ is passed, $M_K n$ is returned
　! SumKey function adds two digits together and returns a
　! MOD(9) number
　set n=1
　loop
　　Call SumKey($S_K n$, $R_K n$, $M_K n$)
　　$M_K = M_K \| M_K n$
　　set n=n+1
　　If $n > R_M$
　　　Break
! Now build and fill the Message Alphabet matrix used to encrypt the msg
Generate Block or Stream Order
　! System parameter determines Block or Stream fill—TOS is
　! Type (Stream or Block) Order Segment
　! The ReadFill function determines the Block starting segment or
　　! the Stream fill order (n=3 for Block fill, 64 for a Stream
　　! fill) from a randomly generated set of numbers between
　　! 1 and 64
　Call ReadFill($TOS_1$, $TOS_2$,, ... $TOS_n$)
Set Message Alphabet
　! Call the SetSegments sub-process to setup the msg alphabet—
　! for a Block, use TOS for the beginning fill segment for the pre-
　　! defined system bit order—if $TOS_1$=54, then the first pre-
　　! defined 6
　! bit block goes into position 5,4; or Stream fill all the segments
　! based on the order they appear—if $TOS_1$=54, 011011 is
　! placed in position 1,1; then continuing up the columns,
　! then the rows for both the stream and block
　! The SCTSEncrypt function uses the generic SEMTS encryption
　　! algorithm to encrypt ($TOS_E$) an input number ($TOS_n$),
　　! Using the input key digit ($SB_K$)
　Call SetSegments($TOS_n$)
　Call SCTSEncrypt($SB_K$, $TOS_n$, $TOS_E$)
! Now build the actual message to send, beginning by encrypting the
! Header values
Encrypt Header
　Using the $SB_K$ and the Type Order digits ($TOD_N$) and the
　　! Header number values ($H_1$, $H_2$, $H_3$ represented $H_n$) as
　　! inputs, returns the Header number Encrypted ($H_{nE}$)
　Call EncryptHeader($SB_K$, $TOD_N$, $H_n$, $H_{nE}$)
! The Header is how many digits in the value, the Header Content is the
! value
Build Encrypted Header Content
　! Using the $SB_K$ and the pre-generated False Bits Length ($FB_L$) and
　! the Random Make Number Length ($R_{ML}$) and the Message
　! Length ($M_L$)
　Call HCLengthEncrypt($SB_K$, $FB_L$, $R_{ML}$, $M_L$, $FB_{LE}$, $R_{MLE}$, $M_{LE}$)
Build Encrypted Message Content
　! The False Bits values don't have to be encrypted, so simply
　! create
　Call GenerateFB($FB_C$)
　! Now encrypt the actual $R_M$ value
　Call Encrypt $R_M$($SB_K$, $R_{MC}$, $R_{MCE}$)
　! Using the $M_K$ and the Message Content ($M_C$), returns the
　! encrypted Message Content ($M_{CE}$)
　Call MsgEncrypt($M_K$, $M_C$, $M_{CE}$)
! Last, optionally build and attach a Digital Signature and then send the
! message
Build DS
　Optionally, build a DS using either the SEMS or an external
　! function (set at the system level as to choice)
　Call BuildDS($M_{CE}$, DS)
Send Message
　! Concatenate the encrypted values
　$TH_E = (TOS_E \| H_{nE} \| FB_{LE} \| FB_C \| R_{MLE} \| R_{MCE}$
　$TM_E = M_{LE} \| M_{CE}$
　! Use either send, depending on the presence of a DS
　If NOT DS
　　! Call Send($TH_E \| TM_E$)
　! or optionally, add the DS when sending
　Else
　　Call Send($TH_E \| TM_E \| DS$)
The Decrypt process is a straightforward application of the existing sub-processes against the message contents, testing the authenticity if a digital signature is used, and revealing the message. The first step that must be taken is to generate the $SB_K$ Source Base key from the $O_K$ original key to decrypt the Type Order Segments, the Header values, False Bits and the Random Make Number. Once these are revealed, the message key suite can be generated in order to then decrypt the actual message contents.

[If should be noted that the period of any brute-force attack of the $SB_K$ is irrelevant and is completely worthless in discovery of either the message or the Original Key. Even if all these values are known, there is still no way to actually decrypt the Message Contents except to brute force attack the $M_K$. The only advantage would be to not have to attempt the additional unknown parameters of where the message actually starts (False Bits), how long the message is (Message Length) or the make-up of the alphabet matrix (Type Order setting). These unknowns add substantial, if not impossible (because they vary to an unknown degree), increases in each key attempt, but even when known, the period of a variable $M_K$ can be impossibly long. It should also be pointed out that it is logically impossible to determine a correct $SB_K$ from any other because none of the plaintext values encrypted by the $SB_K$ have any "grammar"—they are all numeric to start. But since it is a static key, it could be "watched" against a set of messages all using the identical TOS, FB, $R_M$ and $M_L$ or attacked by determining the random generator sequence returns—but this effort cannot be determined to be correct unless one also breaks at least one $M_K$. And then the result is simply that the next, unreasonably long $M_K$ attack wouldn't involve the unknown configuration items. The bottom line is that none of this effort leads to the Original Key, which can be changed instantly, and automatically.]

The code logic for the Decrypt Message process of the present invention is:

MessageDecrypt
        Read Original Key in
            OK1=Digit #1 of key
            OK2=Digit #2 of key
            . . .
            OKn=Last Digit of key
        Generate Source Base Key Number
            ! $SB_K$ is returned
            The GetOkSB# function returns the two $O_K$ digits to sum—in
                ! digit order pairs (1,2; 3,4; 5,6; etc.)
            ! SumKey function adds two digits together and returns a
                ! MOD(9) number
            set n=1
            loop
                Call GetOkSB#( Ok#1, Ok#2)
                Call SumKey( Ok#1, Ok#2, $SB_K$n)
                $SB_K$=$SB_K$||$SB_K$n
                set n=n+1
                If n>$O_K$ keylength
                    Break
    Decrypt TOS
        ! Get TOS from the encrypted message by decrypting it with the
            ! $SB_K$—$TOS_n$ numbers are returned
        Call DecryptRm($SB_K$, $TOS_F$, $TOS_n$)
    Decrypt Header
        ! Get three Header values ($H_1$, $H_2$, $H_3$) for determining the digit length of the actual values for the keys ($R_M$), False Bits ($FB_L$,)
        ! and the Message Length ($M_L$)
        Call DecryptHeader($SB_K$, $H_{nE}$, $H_n$)
    Decrypt Header Content
        ! Use the $H_n$ returns to determine the actual values for the keys
        ! ($R_M$), False Bits ($FB_L$,) and the Message Length ($M_L$)
        Call DecryptHC($SB_K$, $FB_{LE}$, $R_{MLE}$, $M_{LE}$, $FB_L$, $R_{ML}$, $M_L$)
    Discard False Bits
        ! Use $FB_L$ to discard the false message bits
        ! DiscardFalse removes the false random bits from the message
        Call DiscardFalse($FB_L$)
    Decrypt RM
        ! Now decrypt the actual $R_M$ number ($R_{MC}$) to generate the key
        ! suite
        Call DecryptRM($SB_K$, $R_{MCE}$, $R_{MC}$)
    ! $R_{MC}$ is the $R_M$, so notation is now simply $R_M$
    Generate Source Key Number
        ! OKn is passed, $R_M$n is passed, $S_K$n is returned
        ! The GetOk# function returns the next $O_K$ and $R_M$ number
        ! SumKey function adds two digits together and returns a
            ! MOD(9) number
    set n=1
    loop
        Call GetOk#($R_M$n ,Ok#)
        Call SumKey($R_M$n, Ok#, $S_K$n)
        $S_K$=$S_K$||$S_K$n
        set n=n+1
        If n>$R_M$
            Break
    Generate a $R_K$ Random Key
        ! $S_K$n is passed, $R_M$n is passed, $R_K$n is returned
        ! SumKey function adds two digits together and returns a
            ! MOD(9) number
    set n=1
    loop
        Call SumKey($R_M$n, $S_K$n, $R_K$n)
        $R_K$=$R_K$||$R_K$n
        set n=n+1
        If n>$R_M$
            Break
    Generate a $M_K$ Message Key
        ! $S_K$n is passed, $R_K$n is passed, $M_K$n is returned
        ! SumKey function adds two digits together and returns a
            ! MOD(9) number
    set n=1
    loop
        Call SumKey($S_K$n, $R_K$n, $M_K$n)
        $M_K$=$M_K$||$M_K$n
        set n=n+1
        If n>$R_M$
            Break
    If Digital Signature
        ! Decrypt Digital Signature for authentication
        ! first decrypt based on what kind of DS, then compare to the
        ! DS sent in the message

```
Call DSDecrypt(DSin, DSout)
If NOT CompareDS(DSout, MSG_DS)
   ERROR!—Message is INVALID!
   Quit( )
Else
   MSG OK—Continue . . .
DecryptMessageContents
   ! First, set the alphabet matrix w/SetSegments
   Call SetSegments(TOS_n)
   ! Then decrypt the encrypted Message Contents (M_CE)
     using the
   ! Message Key (M_K)
   Call MsgDecrypt(M_K, M_CE, M_C)
   ! MESSAGE CONTENT is M_C
```

Another separate process of the SEDSS that is unique from all other encryption systems, is the automated new key exchange process. In order to add to the complexity and assurance that attempting an exhaustive key search is worthless, which is the only possible type of cryptographic attack against any singular or set of SEDSS messages, the ability to send a new original key within the same context and configuration as a "regular" stream makes the SEDSS complete. This process makes it mathematically impossible to determine any sent new key without first having knowledge of the existing original key. It is also indeterminate as a content message in that it never decrypts—attempting all of the possible message keys against it will simply never yield a content message; and since it is so that numbers never have a grammar with which to compare possible key results against, the SEDSS automated new original key exchange process is totally secure.

A new key message differs from a normal message in one respect only: the Header defined length of the Random Make Number will be 2 times the Original Key length. E.g., the first 6 bits of the Header section will dictate a $R_M$ digit length of 6 digits if the Original Key digit length was 3. The remainder of the message configuration is identical to a normal message. It should be pointed out that even if the message is "discovered" to be a new key message, there is no advantage or cryptographic means by which the new key can be derived without the current Original Key. This is because the message never "decrypts" into any meaningful digital traffic; it is simply a numeric translation from one key to another, and any particular translation can never be known to be the correct one without the Original Key. (It is also noted that the length of this message will be considerably shorter than a "normal" digital stream, but any new key message can be appended directly to any other stream in a completely inscrutable manner. Any new key message can be sent in "mid-stream" between two others completely disguised from discovery.)

The message configuration for a new key message is identical to a normal message except the $H_1$ (first 6 bit Header block) that determines the $R_M$ digit length will be twice the current Original Key length definition. When this "flag" is set, then the message is identified as a new key message.

The process
   Generate a New Original Key; the maximum and minimum lengths of which are set by SEDSS system parameters
   Generate a current message $R_M$ that is a valid length as defined by the current $O_K$ length; and that is the length of the current $O_K$, not a variable length. (A normal $R_M$ digit length can be up to, but not more than the current $O_K$ digit length. A new key $R_M$ must be exactly the same as the current $O_K$ digit length, as the Header definition is instead used as the new key flag.)
   Define and encrypt the $H_1$ digit length to be twice the current $O_K$ digit length
   Encrypt the remaining Header sections, with the message length defined by the formula $(NOK_L/2)*6$ where $NOK_L$ is the New Original Key Length
   Encrypt the remaining message sections, with false bits included
   The New Original Key, which is the message content, is encrypted by taking the digit pairs and first SEMTS encrypting them using the $R_K$ Random Key, and then SEMTS encrypting that result with the current $M_K$ Message Key. That resulting pair is used as a $[C_E, R_E]$ matrix position and the corresponding bit sequence is returned as the encrypted bit stream. The formula:

$$(((R_K + NOK_X) MOD 9) + M_K) MOD 9 = C_E, \text{ or } R_E$$

where $NOK_X$ is the New Original Key xth digit and $C_E$ or $R_E$ is the returned encrypted Column or Row
   The $[C_E, R_E]$ are then used to identify a matrix position and return the corresponding bit sequence.

Decryption of an automated new original key exchange message is dependent on the reading of the $H_1$ Header block for the $R_M$ digit length as twice the $O_K$ current length. Since the real $R_M$ length is not sent in the $H_1$ Header block, it is read as being exactly as long as the current $O_K$ length. Once it is established that a particular message is a new key message, then decryption proceeds as normal, with the exception that the actual message bits for the contents are discarded after the $[C_E, R_E]$ numbers are decrypted and returned. All of the combined decrypted $[C_E, R_E]$ pairs will then be the new Original Key. This length can be more or less than the current $O_K$ digit length, but not more than the system defined maximum length.

EXAMPLE

The following is an example to clarify the secure digital streaming system, while referring to FIG. 1.

COMPANY_A and COMPANY_B are two public entities who wish to communicate electronically and send secure digital streams to each other. This will be accomplished by using two electronic devices that have embedded the SEDSS encryption capability.

The first step for these two entities is to agree on four system parameters. The first is whether the SEDSS streams will be block or stream encrypted, and the other three are the minimum and maximum values for the original keys, the number of false bits to front load in every message, and the number of bits that will be sent in each uniquely encrypted stream. For this example, COMPANY_A and COMPANY_B agree on the following:

The message streams will be sent STREAM encrypted
   Original Key ($O_K$) minimum length=20 digits, maximum=50 digits
   False Bits Length (FBL) min length=180 bits, max=6144 bits
   Message Length (ML) min length=10,000,000 bits (10 Mb), max=99,999,999 bits (99 Mb).

These values are stored in each of the SEDSS electronic devices for comparison to the message communications.

In step 101, the first original key must be agreed on and distributed to both electronic devices. This would usually be a minimum value key, and the first message sent would be a new key message with a new original key length closer to the maximum. This ensures a greater cipher period for the first content message, while making it easier to "out of band" distribute a smaller key between the participants. For the example, the $O_K$ original key to be used for the first digital stream message is "85077348146254812803".

COMPANY_B wishes to send the following bit stream message to COMPANY_A: (for the purposes of this example, this is an extremely small segment stream, and is not a new key message) "011001 010001 001010 010101 011011 100101 011100." The SEDSS will be used to secure the stream, and the steps in order are:

Generate a Random Make Number ($R_M$) (step 107)

Generate False Bits Length (FBL) (step 108)

Generate Message Length (ML) (step 109)

Generate Key Suite (SBK, SK, RK, MK) (steps 102–105, respectively)

Generate stream Type Order Segment (TOS) (step 111)

Set the Segment Matrix bit alphabet, as determined by the TOS (step 112)

Encrypt the Header (step 114)

Build the Encrypted Header Content (step 115)

Build the Encrypted Message Content (step 116)

Optionally, build a DS (which will not be done for this example) (step 118)

Send the Message (step 120)

Referring to FIG. 1, the original key is read in (step 101) and the process moves to the next steps.

Step 1—Generate a Random Make Number ($R_M$)

The first step (step 107) is to create the $R_M$ random make number of a digit length between the minimum and the maximum key lengths. The $R_M$ random make number is generated by a random number generation process, and for this message, the number is "2038173564."

Step 2—Generate False Bits Length (FB,)

Next, the false bits length is generated in step 108. Generation of the FBL must be between 180 and 6144 bits, and can be divisible by either 6 or 8 or any "standard" electronic "word" size (32, 64, etc.). The purpose of the False Bits is to expand the number of decryption attempts per key searched, so while this number is less significant if divisible by a word size, it still helps to obscure the actual message start, increases the attempts per individual key searched, and adds significantly to the processing resources that must be applied to each key searched. The example value is "186".

Step 3—Generate Message Length ($M_L$)

Next in step 109, the message length is generated. The $M_L$ for this message will be 10,001,536 bits. (The example will only concern itself with the above listed 7 block example segment.)

Step—4 Generate Key Suite ($SB_K$, $S_K$, $R_K$, $M_K$)

Steps 102–105 are performed to generate the key suite. The $O_K$ ("85077348146254812803") generates a base source key (SBK in digit order) of "4713580013" (8+5 MOD(9)=4, 0+7 MOD(9)=7, 7+3 MOD(9)=1, 4+8 MOD (9)=3, 1+4 MOD(9)=5, 6+2 MOD(9)=8, 5+4 MOD(9)=0, 8+1 MOD(9)=0, 2+8 MOD(9)=1, 0+3 MOD(9)=3).

The $S_K$, using the $R_M$ of "203817356438", is "153681747801"

The $R_K$, using the $R_M$ of "203817356438" also, is "356508104330"

The $M_K$, using the $R_K$ and the $S_K$, is "410280842231"

Step 5—Generate stream Tape Order Signature (TOS)

In step 111,the type order signature is generated. A randomly generated order of the numbers 1–64 is required to create the TOS. "53051927604635114962 . . . " Since our message content example only includes 7 blocks of data, the pertinent order numbers are "53 05 19 27 60 46 35" with the spaces for emphasis.

Step 6—Set the Segment Matrix bit alphabet, as determined by the TOS

In step 112, the message alphabet is set. The matrix fill of the bit alphabet, based on the just generated TOS would be:

| Column,Row | Bits | TOS Number | Position |
|---|---|---|---|
| 1,1 | 101011 | 53 | 1 |
| 2,1 | 101000 | 05 | 2 |
| 3,1 | 110010 | 19 | 3 |
| 4,1 | 110110 | 27 | 4 |
| 5,1 | 001111 | 60 | 5 |
| 6,1 | 011101 | 46 | 6 |
| 7,1 | 110001 | 35 | 7 |
| . . . | | | |

This matrix fill is used to encrypt the coming message content stream. In order to send this particular bit matrix alphabet to the recipient, the TOS number sequence is encrypted using the SBK and the formula $(SO_X+SB_K)$ MOD9=n where n cannot equal zero, the SBK digit cannot be zero and $SO_X$ is the Stream Order digit. Using the SBK of "4713580013", and the $SO_X$ digits, the result is "34 31 23 65 73 37 63". These are calculated by:

(5+4)MOD9=0, which is illegal, so (5+7)MOD9=3

(3+1)MOD9=4, using the next digit of the $SB_K$m, which continually is cycled (0+3)MOD9=3

(5+5)MOD9=1

(1+8)MOD9=0, again illegal, then the two zero $SB_K$ digits are skipped, so is (1+1)MOD9=2

(9+3)MOD9=3, notice that 9 is allowed as a $SO_X$ digit input, because the $SB_K$ digit is never 9, this formula will still have a return value that will yield a valid matrix position to be sent as the ciphertext.

(2+4)MOD9=6

. . .

The final result pairs ("34 31 23 65 73 37 63") are then used to return encrypted bits based on the matrix position (Column,Row) of the pairs; E.g., the C,R pair for Column 3 and Row 4 is position 27, which is bit sequence 110110. Therefore, the first 6 bit block of the 384 bit TOSE is 110110. The remainder of the blocks are 110000 (3rd position for 3,1), 010010 (18th position for 2,3), 011001 (38th position for 6,5), 111010 (23rd position for 7,3), 110011 (51st position for 3,7) and 011010 (22nd position for 6,3). The final $TOS_E$ is "110110110000 010010 011001 111010 110011 011010" with the spaces for emphasis.

Step 7—Encrypt the Header

In step 114, the header is encrypted. The Header has three sections with $H_1$=02 ("10" is the number of digits in the $R_M$ and "10" is two digits long), $H_2$=03 ("186" is the number of false bits, 3 digits long), and $H_3$=08 ("10,001,536" is the message length in bits, 8 digits long). Encrypting these values uses the formulas:

$$(((SB_K+SOD_C)MOD9)+H_{1x})MOD9=C_E$$

where $SOD_C$ is the Random Stream Order Digit Column (1st digit of stream) and $H_{1x}$ is the $H_I$ first digit $$(((SB_K+SOD_R)MOD9)+H_{1x})MOD9=R_E$$

where SOD$_R$ is the Random Stream Order Digit Row (2nd digit of stream) and H$_{1X}$ is the H$_I$ second digit The example H$_{1C}$ is then (((4+5)MOD9)+0)MOD9, which is illegal, due to the (5+4)MOD9 result of 0; so the formula is (((7+5)MOD9)+0)MOD9=3, using the next SB$_K$ digit, a 7. H$_{1R}$ is (((1+3)MOD9)+2)MOD9=6. Looking in column 3, row 6 of the TOS loaded matrix bit alphabet, would return 111000, if in our example those were the bits loaded in that segment. If a H$_{1C}$, H$_{1R}$ encrypted pair returned column 5, row 1 from our example matrix, the 6 bit block in the header would be 001111. The two other Header sections are encrypted in the same manner, returning a 6 bit block for each section. The total encrypted Header section H$_{nE}$, for instance, could be "111000 001111 100110."

Step 8—Build the Encrypted Header Content

In step 115, the encrypted header content is built. The encrypted Header Content includes the values that are "pointed" to by the Header. The first Header Content number to encrypt is the FB$_L$ which is "186". These Header Content numbers are encrypted using the SBK and the SEMTS standard formula. (1+4)MOD9=5, (8+7)MOD9=6, (6+1)MOD9=7 and since number of digits required to create a return block, the default of 1 is used (1+3)MOD9=4. These [C$_E$,R$_E$] values are used to again look up the bits to be returned in the TOS loaded bit matrix alphabet. [5,6] would return the bits in that segment of the matrix and [7,4] would return those bits. The "10" for the R$_{ML}$ would be returned in one block, and the "10,001,536" would be returned in four blocks. The total encrypted Header Content for our example would be two blocks for the false bits (FB$_{LE}$), one for the R$_{MLE}$, and four for the M$_{LE}$—seven blocks in total.

Step 9—Build the Encrypted Message Content

In step 116, the encrypted message content is built. This step entails first generating the actual false bits, FB$_C$, 186 of them. Then encrypting the actual R$_M$ value, "203817356438" using the SBK of "4713580013", in the SEMTS formula (SB$_K$+R$_{MC}$)MOD9=n results in an RMCE of "674266357776". The bits sent to represent this result are found in [C$_E$]$_{pairs}$ [6,7], [4,2], [6,6], [3,5], [7,7], [7,6]

if there were an uneven digit number in the R$_M$, then the last "default" row value would be a "1". After finding these six blocks in the matrix, the last action in this step is to encrypt the actual message bit stream. This is accomplished by using the M$_K$ of "410280842231" and the corresponding identified bit positions of each plaintext 6 bit block; e.g., the message stream "011001 010001 001010 010101 011011 100101 011100" would be looked up in 6 bit blocks, and the corresponding [C,R] digit pairs are encrypted using the M$_K$ and the SEMTS formulas $(M_K+MSG_{CX})MOD9=C_E$ and $(M_K+MSG_{RX})MOD9=R_E$ and then the [C$_E$, R$_E$] resulting digit pairs are used to return those matrix segment bits as the encrypted ciphertext message content M$_{CE}$.

Step 10—Skipped

In step 118, the digital signature is built and encrypted. This step is being skipped for this example.

Step 1113 Send the Message

In step 120, the message is concatenated and sent. This is simply the process of sending out the encrypted ciphertext bits in the proper order and configuration. In the steps proceeding, the processing is grouped logically by functions that are similar (e.g., all of the length value encryptions are done together); but the steps can be linked to be performed in exactly the following order, and then the bits can be sent out in the manner and order in which they are created with the message in the proper format. The total digital stream is $$TOS_E\|H_{nE}\|FB_{LE}\|FB_C\|R_{MLE}\|R_{MCE}\|M_{LE}\|M_{CE}$$

Figure 2:
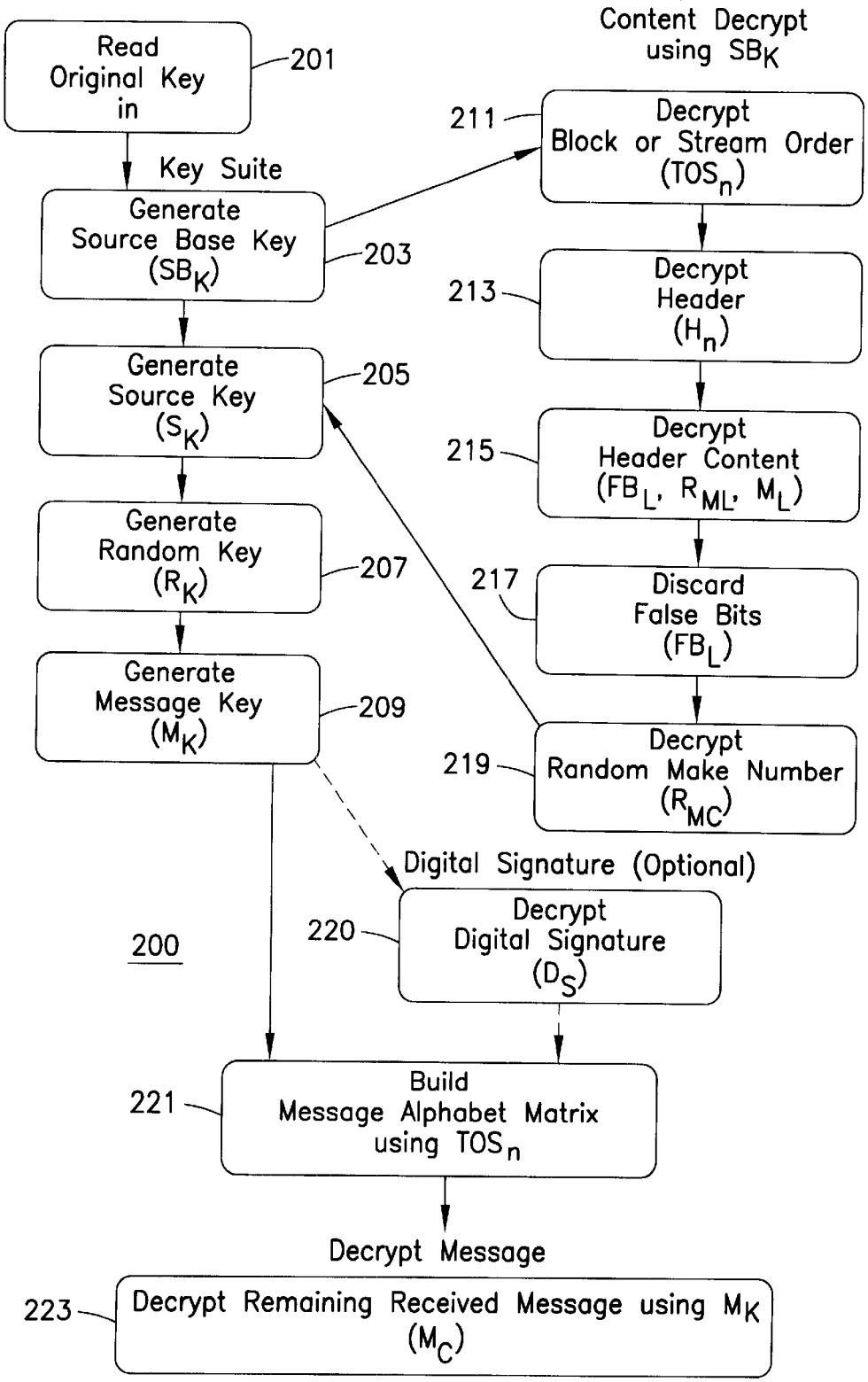
FIG. 2 depicts one exemplary embodiment of a method for decrypting a message according to the present invention.

Referring to FIG. 2, the entity mapping for the decrypt message process 200 according to the present invention is depicted. The decryption process for COMPANY_A to decipher the stream message is a simple application of the O$_K$ original key, deciphering the SB$_K$ encrypted configuration items, reading in the R$_{MCE}$ encrypted random make number to generate the unique key suite, and then applying the message key to the contents stream, M$_{CE}$.

The known values at the start of a decryption are the O$_K$ original key (read in in step 201) and the SB$_K$ Source Base Key (generated in step 203). Next, the process moves to step 211, in which decryption begins by applying the SB$_K$ to the first 384 bits to reveal the TOS for the matrix assignment (these bits are decrypted to the number sequence of the TOS, they are not evaluated against any prior matrix segment); in step 221, the encryption matrix is then built from the TOS numbers so that the remaining ciphertext bits can be compared and found in the proper segments. (If the example message were a block TOS, then only the first 18 bits are read, and the matrix is filled accordingly.)

After completion of the TOS matrix bit alphabet, the remaining entire decryption process (step 223) is reliant on first reading and comparing the bits into the matrix, and then using the general decryption formulas for "reverse" processing any of the SEMTS encryption formula ciphertext. The only changing element in the decryption formulas is which key to use at which point in the process. The formulas are:

$$((9+n)-b))MOD9=a$$

where n is the ciphertext value and b is the known key digit and the result, a is the message plaintext.

In step 213, decryption of the Header uses the formulas:

$$(((9+C_E)-(SB_K+SOD_C)MOD9)MOD9=H_{1C}$$

$$(((9+R_E)-(SB_K+SOD_R)MOD9)MOD9=H_{1R}$$

In step 215, these two formulas are applied to the message Header to determine how many blocks to expect in each of the Header Content sections—the false bits FB$_L$, the R$_{ML}$ length and the message length, M$_{LE}$. The corresponding blocks for these values are read and decrypted, and then those revealed numbers indicate how many blocks to read for each section. The number of blocks to read is based on taking the deciphered digit length of the value (e.g., 03) and dividing by 2, rounding up to the next whole number. When there is a fractional value, and the number is rounded up to get a whole number of return blocks, then the last decrypted number, the final row value of "1" will be discarded.

Once the actual Header Content values are deciphered (step 215), then the false bits can be discarded (step 217), the R$_M$ (decrypted in step 219) can be used to generate the key suite (steps 205–209), and the remaining message stream content can be decrypted (step 223). COMPANY_A, and only COMPANY_A, can read the SEDSS COMPANY_B electronic digital stream.

The optional digital signature can be decrpyted in step 220 by using the generated key suite, else the process skips this step and moves to step 221.

Figure 3:
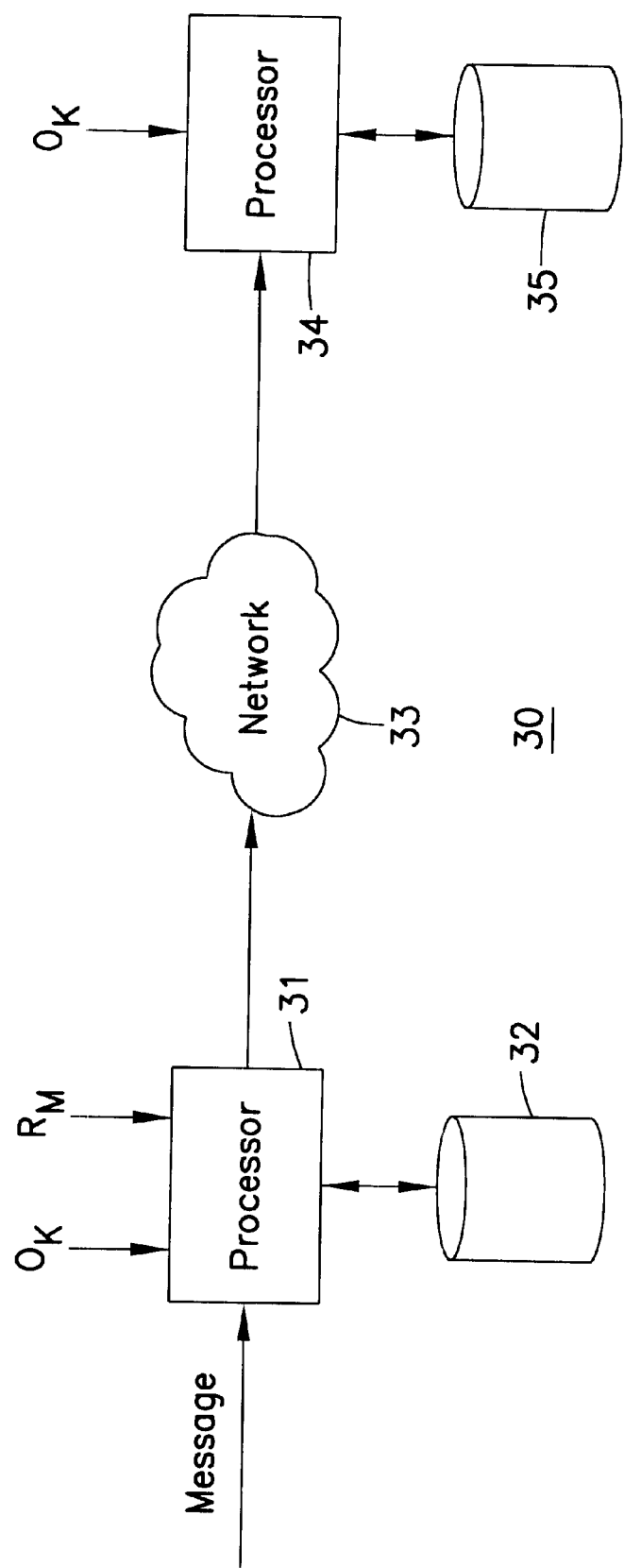
FIG. 3 depicts an exemplary embodiment of two parties employing exemplary apparatus of the present invention that implement the methods of the present invention to communicate.

FIG. 3 depicts an exemplary embodiment of a system 30 using the above described methods of the present invention to communicate. A processor 31, e.g., a personal computer or server, programmed to perform the above method of encrypting receives the message to be encrypted. The processor 31 is coupled to a memory 32 (e.g., a database, disk storage, or random access memory) in which the processor stores the various keys and buffers the messages while they are being encrypted. The processor 31 can either generate the Random Make Number $R_M$ using a random number generator routine or receive it from a user. The Original Key $O_K$ is shown as an input to the processor 31, as at least the first version must be input. Once the encrypted communications is established, future keys can be transmitted over the encrypted communications channel 33 created by the two parties.

Upon receiving the message to be encrypted, the processor 34 creates the encrypted message using the process 100 depicted in FIG. 1 and then communicates the encrypted message to the intended recipient. This communication can be accomplished via a network 33 (e.g., the Internet, a telephone network, or a computer network) or other communications system, for example. Other possibilities could be to store the message in a computer readable media and then ship the media to the user.

At the receive end, another processor 34 programmed to perform the decrypt process 200 depicted in FIG. 2 is coupled to the communications system or network 33. Upon receipt of the encrypted message, the processor 34 decrypts the message using the method 200 depicted in FIG. 2. To properly decipher the message, the processor 34 requires the same Original Key $O_K$ used to encrypt the message. The processor 34 also uses a memory 35 for buffering the message while decrypting it and for storing the various keys used in the decrypt process.

While the above exemplary embodiment has been discussed using a 6-bit sequence, and hence a 64 position matrix, the present invention is not so limited. Furthermore, any base of numbers can be used in the present invention, not just the base-9 used in the exemplary embodiment. For example, generalizing the present invention, if the bit segments have a bit length of m bits, then the matrix must have at least $2^m$ positions to permit proper decoding. Other possible modifications to the exemplary embodiment are possible without departing from the present invention, as defined in the claims that follow.

What is claimed is:

1. A method for encrypting a digital bit stream comprising:

determining a message key by modular summing digits of an original key with digits of a random number, whereby the message key has a length equal to a length of the random number;

generating a random order of numbers from 1 to k, wherein each number in the random order has m digits, where:

$m-1 < \log_{10} k \leq m;$ starting at a predetermined position in a matrix and placing a first bit sequence of length $j=\log_2 k$, said first bit sequence representing a first number having m digits in the random order of numbers from 1 to k, moving to a next predetermined position in the matrix and placing a second bit sequence of length $j=\log_2 k$, said second bit sequence representing a second number having m digits in the random order of numbers from 1 to k, and continuing to place bit sequences of length $j=\log_2 k$, said bit sequences representing each of the numbers having m digits in the random order of numbers from 1 to k until all positions in the matrix are filled with bit sequences of length $j=\log_2 k$, said bit sequences representing all of the numbers having m digits in the random order of numbers from 1 to k;

encrypting the message stream by:

segmenting the message stream into a plurality of blocks of length j bits;

using a column position and a row position of a first bit sequence disposed in a first position in the matrix, in which a plurality of bit sequences are distributed throughout, to identify the first bit sequence;

encrypting the column position and the row position with a modular base-n formula to obtain an encrypted column position and an encrypted row position; and transmitting a second bit sequence disposed in the matrix at the encrypted column position and the encrypted row position as an encrypted version of the first bit sequence; and encrypting the random order of numbers from 1 to k by modular summing, using a base of n, predetermined digits of a first key derived from the original key and the digits of the random order of numbers from 1 to k, wherein only nonzero digits of the first key and nonzero results of the modular summing are used in the encryption process.

2. The method according to claim 1, further comprising segmenting the encrypted random order of numbers from 1 to k into a plurality (k/m) of segments of m digits, and for each of the plurality of segments of m digits, using some of the m digits as a column pointer and the remaining digits of the m digits as a row pointer and returning a bit sequence located at a matrix position defined by the column pointer and the row pointer for said each of the plurality of segments of m digits.

3. The method according to claim 2, further comprising creating three header pointers, wherein a first header pointer ($H_1$) specifies the number of digits in a representation of the random number ($R_M$), a second header pointer ($H_2$) specifies the number of digits in a representation of a plurality of embedded false bits, and a third header pointer ($H_3$) specifies the number of digits in a representation of the message length.

4. The method according to claim 3, further comprising encrypting the three header pointers by modular summing using a base of n predetermined digits of the three header pointers with predetermined digits of the first key, and then location a bit sequence in the matrix based on resulting encrypted values of each of the three header pointers by using them as column and row pointers.

5. The method according to claim 4, further comprising encrypting the number of digits in the random number by modular summing using a base of n predetermined digits of the number of digits in the random number with predetermined digits of the first key, and then locating bit sequences in the matrix based on pairs of the resulting modular summations, which pairs are used as column and row pointers.

6. The method according to claim 5, further comprising encrypting the number of embedded false bits by modular summing using a base of n predetermined digits of the number of false bits with predetermined digits of the fist base key, and then locating bit sequences in the matrix based on pairs of the resulting modular summations, which pairs are used as column and row pointers.

7. The method according to claim 6, further comprising encypting the number of bits in the message length by modular summing using a base of n predetermined digits of the number of bits in the message length with predetermined digits of the first base key, and then locating bit sequences in the matrix based on pairs of the resulting modular summations, which pairs are used as column and row pointers.

8. The method according to claim 7, further comprising generating the plurality of embedded false bits.

9. The method according to claim 8, further comprising encrypting the random number by modular summing using a base of n predetermined digits of the random number with predetermined digits of the first key, and then locating bit sequences in the matrix based on pairs of the resulting modular summations, which pairs are used as column and row pointers.

10. The method according to claim 9, further comprising formatting a total message as:

$$TOS_E \| H_{nE} \| FB_{LE} \| FB_C \| R_{MLE} \| R_{MCE} \| M_{LE} \| M_{CE}$$

where $TOS_E$ represents the encrypted random order of numbers, $H_{nE}$ represents the encrypted header pointers, $FB_{LE}$ represents the encrypted false bits length, $FB_C$ represents the false bits generated, $R_{MLE}$ represents the encrypted number of digits in the random number, $R_{MCE}$ represents the encrypted random number, $M_{LE}$ represents the encrypted number of bits in the message length, and $M_{CE}$ represents the encrypted message stream.

11. The method according to claim 1, further comprising generating the random number of base n having a variable length between a first predetermined minimum value and a first predetermined maximum value.

12. A method for encrypting a digital bit stream comprising:

determining a message key by modular summing digits of an original key with digits of a random number, whereby the message key has a length equal to a length of the random number;

generating a random order of numbers from 1 to k, wherein each number in the random order has m digits, where:

$$m-1 < \log_{10} k \leq m;$$

stating at a predetermined position in a matrix and placing a first bit sequence of length $j=\log_2 k$, said first bit sequence representing a first number having m digits in the random order of numbers from 1 to k, moving to a next predetermined position in the matrix and placing a second bit sequence of length $j=\log_2 k$, said second bit sequence representing a second number having m digits in the random order of numbers from 1 to k, and continuing to place bit sequences of length $j=\log_2 k$, said bit sequences representing each of the numbers having m digits in the random order of numbers from 1 to k until all positions in the matrix are filled with bit sequences of length $j=\log_3 k$, said bit sequences representing all of the numbers having m digits in the random order of numbers from 1 to k, encrypting the message stream by:
    segmenting the message stream into a plurality of blocks of length j bits;
    using a column position and a row position of a first bit sequence disposed in a first position in the matrix, in which a plurality of bit sequences are distributed throughout, to identify the first bit sequence;
    encrypting the column position and the row position with a modular base-n formula to obtain an encrypted column position and an encrypted row position; and
    transmitting a second bit sequence disposed in the matrix at the encrypted column position and the encrypted row position as an encrypted version of the first bit sequence; and
    determining a number of false bits to be included in the encrypted digital stream.

13. The method according to claim 1, wherein the first key ($SB_K$) is generated by modular summing predetermined combinations of the original key ($O_K$).

14. The method according to claim 1, wherein said determining the message key ($M_K$) further comprises:

generating a second key ($S_K$) from the original key ($O_K$) and the random number ($R_M$);

generating a third key ($R_K$) from the second key ($S_K$) and the random number ($R_M$); and generating the message key ($M_K$) from the third key ($R_K$) and the second key ($S_K$).

15. The method according to claim 14, wherein the second key ($S_K$) is generated from the original key ($O_K$) and the random number ($R_M$) according to the following formula:

$$(x+y)MOD(9)=i$$

where x and y are predetermined digits of the original key ($O_K$) and the random number ($R_M$), respectively, and i is a resulting digit of the second key ($S_K$).

16. The method according to claim 14, wherein the third key ($R_K$) is generated from the second key ($S_K$) and the random number ($R_M$) according to the following formula:

$$(x+y)MOD(9)=i$$

where x and y are predetermined digits of the second key ($S_K$) and the random number ($R_M$), respectively, and i is a resulting digit of the third key ($R_K$).

17. The method according to claim 14, wherein the message key ($M_K$) is generated from the second key ($S_K$) and the third key ($R_K$) according to the following formula:

$$(x+y)MOD(9)=i$$

where x and y are predetermined digits of the second key ($S_K$) and the third key ($R_K$), respectively, and i is a resulting digit of the message key ($M_K$).

18. The apparatus according to claim 14, wherein the set of programming instructions includes:

generating a first random number ($R_M$) having a variable length and of base n; and determining a message length ($M_L$) based on the fist random number.

19. The apparatus according to claim 18, wherein the set of programming instructions includes modular summing predetermined digits of the first random number with predetermined digits of a key to create a message key having a length equal to the message length ($M_L$).

20. The apparatus according to claim 18, wherein the set of programming instructions includes generating a second random number representing a number of bits to be placed at a beginning of the message ($FB_L$).

21. An apparatus for encoding a bit stream comprising a processor executing a set of programming instructions to encode the bit stream, and a programmable media having stored therein:

an original key; and a set of programming instructions for programming the processor, said instructions including:

using a column position and a row position of a first bit sequence disposed in a first position in a table, in which a plurality of bit sequences are distributed throughout the table, to identify the first bit sequence;

encrypting the column position and the row position with a modular base-n formula to obtain an encrypted column position and an encrypted row position;

transmitting a second bit sequence disposed in the table at the encrypted column position and the encrypted row position as an encrypted version of the first bit sequence; and encrypting the random order of numbers from 1 to k by modular summing, using a base of n, predetermined digits of a first key derived from the original key and the digits of the random order of numbers from 1 to k, wherein only nonzero digits of the first key and nonzero results of the modular summing are used in the encryption process.

22. The apparatus according to claim 21, wherein the set of programming instructions further includes segmenting the encrypted random order of numbers from 1 to k into a plurality (k/m) of segments of m digits, and for each of the plurality of segments of m digits, using some of the m digits as a column pointer and the remaining digits of the m digits as a row pointer and returning a bit sequence located at a matrix position defined by the column pointer and the row pointer for said each of the plurality of segments of m digits.

23. The apparatus according to claim 22, wherein the set of programing instructions further includes creating three header pointers, wherein a first header pointer ($H_1$) specifies the number of digits in a representation of the random number ($R_M$), a second header pointer ($H_2$) specifies the number of digits in a representation of a plurality of embedded false bits, and a third header pointer ($H_3$) specifies the number of digits in a representation of the message length.

24. The apparatus according to claim 23, wherein the set of programming instructions further includes encrypting the three header pointers by modular summing using a base of n predetermined digits of the three header pointers with predetermined digits of the first key, and then locating a bit sequence in the matrix based on resulting encrypted values of each of the three header pointers by using them as column and row pointers.

25. The apparatus according to claim 24, wherein the set of programming instructions further includes encrypting the number of digits in the random number by modular summing using a base of n predetermined digits of the number of digits in the random number with predetermined digits of the first key, and then locating bit sequences in the matrix based on pairs of the resulting modular summations, which pairs are used as column and row pointers.

26. The apparatus according to claim 25, wherein the set of programming instructions further includes encrypting the number of embedded false bits by modular summing using a base of n predetermined digits of the number of false bits with predetermined digits of the first base key, and then locating bit sequences in the matrix based on pairs of the resulting modular summations, which pairs are used as column and row pointers.

27. The apparatus according to clan 21, wherein the set of programming instructions further includes encrypting the number of bits in the message length by modular summing using a base of n predetermined digits of the number of bits in the message length with predetermined digits of the first base key, and then locating bit sequences in the matrix based on pi of the resulting modular summations, which pain are used as column and row pointers.

28. The apparatus according to claim 27, wherein the set of programming instructions further includes generating the plurality of embedded false bits.

29. The apparatus according to claim 28, wherein the set of programming instructions further includes encrypting the random number by modular summing using a base of n predetermined digits of the random number with predetermined digits of the first key, and then locating bit sequences in the matrix based on pairs of the resulting modular summations, which pairs are used as column and row pointers.

30. The apparatus according to claim 29, wherein the set of programming instructions further includes formatting a total message as:

$$TOS_E||H_{nE}||FB_{LE}||FB_C||R_{MLE}||R_{MCE}||M_{LE}||M_{CE}$$

where $TOS_E$ represents the encrypted random order of numbers, $H_{nE}$ represents the encyrpted header pointers, $FB_{LE}$ represents the encrypted false bits length, $FB_C$ represents the false bits generated, $R_{MLE}$ represents the encrypted number of digits in the random number, $R_{MCE}$ represents the encrypted random number, $M_{LE}$ represents the encrypted number of bits in the message length, and $M_{CE}$ represents the encrypted message stream.

31. The apparatus according to claim 32 wherein the set of programming instructions further includes generating the random number of base n having a variable length between a first predetermined minimum value and a first predetermined maximum value.

32. An apparatus for encrypting a bit stream comprising a processor executing a set of programming instructions to encrypt the bit stream, and a programmable media having stored therein:

an original key;

a set of programming instructions for programming the processor, said instructions including:

determining a message key by modular summing digits of an original key with digits of a random number, whereby the message key has a length equal to a length of the random number;

generating a random order of numbers from 1 to k, wherein each number in the random order has m digits, where:

$$m-1<\log_{10} k \leq m;$$

starting at a predetermined position in a matrix and placing a first bit sequence of length $j=\log_2 k$, said first bit sequence representing a first number having m digits in the random order of numbers from 1 to k, moving to a next predetermined position in the matrix and placing a second bit sequence of length $j=\log_2 k$, said second bit sequence representing a second number having m digits in the random order of numbers from 1 to k, and continuing to place bit sequences of length $j=\log_2 k$, said bit sequences representing each of the numbers having m digits in the random order of numbers from 1 to k until all positions in the matrix are filled with bit sequences of length j=log₂ k, said bit sequences representing all of the numbers having m digits in the random order of numbers from 1 to k, encrypting the message stream by:
segmenting the message stream into a plurality of blocks of length j bits;
using a column position and a row position of a first bit sequence disposed in a first position in the matrix, in which a plurality of bit sequences are distributed throughout, to identify the first bit sequence;
encrypting the column position and the row position with a modular base-n formula to obtain an encrypted column position and an encrypted row position; and
transmitting a second bit sequence disposed in the matrix at the encrypted column position and the encrypted row position as an encrypted version of the first bit sequence; and
determining a number of false bits to be included in the encrypted digital stream.

33. The apparatus according to claim 32, wherein the set of program instructions further includes generating the first key ($SB_K$) by modular summing predetermined combinations of the original key ($O_K$).

34. The apparatus according to claim 32, wherein the set of programming instructions further includes:
generating a second key ($S_K$) from the original key ($O_K$) and the random number ($R_M$);
generating a third key ($R_K$) from the second key ($S_K$) and the random number ($R_M$); and
generating the message key ($M_K$) from the third key ($R_K$) and the second key ($S_K$).

35. The apparatus according to claim 34, wherein the second key ($S_K$) is generated from the original key ($O_K$) and the random number ($R_M$) according to the following formula:

$$(x+y)MOD(9)=i$$

where x and y are predetermined digits of the original key ($O_K$) and the random number ($R_M$), respectively, and i is a resulting digit of the second key ($S_K$).

36. The apparatus according to claim 34, wherein the third key ($R_K$) is generated from the second key ($S_K$) and the random number ($R_M$) according to the following formula:

$$(x+y)MOD(9)=i$$

where x and y are predetermined digits of the second key ($S_K$) and the random number ($R_M$), respectively, and i is a resulting digit of the third key ($R_K$).

37. The apparatus according to claim 34, wherein the message key ($M_K$) is generated from the second key ($S_K$) and the third key ($R_K$) according to the following formula:

$$(x+y)MOD(9)=i$$

where x and y are predetermined digits of the second key ($S_K$) and the third key ($R_K$), respectively, and i is a resulting digit of the message key ($M_K$).

38. The apparatus according to claim 32, wherein the original key stored within the storage is a minimum value key, and the processor derives a new original key from a first message received, which a new original key has a key length closer to a maximum original key length.

39. The apparatus according to claim 32, wherein the storage has stored therein a predetermined maximum number of false bits and a predetermined minimum number of false bits to be included in an encoded message.

40. A method for decrypting an encrypted digital bit stream comprising:
a) generating a first key from an original key by modular summing base-n predetermined digits of the original key to form digits of the first key;
b) converting a first plurality (k) of m-bit bit sequences into a first plurality (k) of numbers;
c) decrypting the first plurality (k) of numbers by modular summing base-n predetermined digits of the first key with predetermined digits of the first plurality (k) of numbers;
d) using the decrypted first plurality (k) of numbers to create a matrix having all possible combinations of m-bit bit sequences distributed throughout, wherein each possible combination of bits occupies a unique position in the matrix; and
e) determining a first position in the matrix of a first encrypted bit sequence;
f) deriving a message key from the first key and the original key;
g) decrypting an encrypted row number of the first position by modular summing base-n predetermined digits of the message key and the encrypted row number;
h) decrypting an encrypted column number of the first position by modular summing base-n predetermined digits of the message key and the encrypted column number;
i) locating a second bit sequence in the matrix based on the decrypted row number and decrypted column number; and
j) returning the second bit sequence as the decrypted bit sequence, wherein in steps c), g) and h) a result of the modular summing base-n is discarded if zero, and a digit of the first key is skipped if zero.

41. The method according to claim 40, wherein said c) decrypting further comprises decrypting according to the following formula:

$$((9+j)-b))MOD9=a$$

where j is an encrypted value and b is a key digit of the first key and a is a resulting decrypted value.

42. A method for decrypting an encrypted digital bit stream comprising:
generating a first key from an original key by modular summing base-n predetermined digits of the original key to form digits of the fist key;
converting a first plurality (k) of m-bit bit sequences into a first plurality (k) of numbers;
decrypting the first plurality (k) of numbers by modular summing base-n predetermined digits of the first key with predetermined digits of the first plurality (k) of numbers;
using the decrypted first plurality (k) of numbers to create a matrix having all possible combinations of m-bit bit sequences distributed throughout, wherein each possible combination of bits occupies a unique position in the matrix; and
determining a first position in the matrix of a first encrypted bit sequence;
deriving a message key from the first key and the original key;

decrypting an encrypted row number of the first position by modular summing base-n predetermined digits of the message key and the encrypted row number;

decrypting an encrypted column number of the first position by modular summing base-n predetermined digits of the message key and the encrypted column number;

locating a second bit sequence in the matrix based on the decrypted row number and decrypted column number;

returning the second bit sequence as the decrypted bit sequence; and using the first key to decrypt header values, false bits and a random number.

43. The method according to claim 42, further comprising generating the message key from the first key and the random number.

44. The method according to claim 40, wherein the first key is generated by modular summing predetermined combinations of the original key ($O_K$).

45. The method according to claim 42, wherein said generating the message key further comprises:

generating a second key from the original key and the random number;

generating a third key from the second key and the random number; and generating the message key from the third key and the second key.

46. The method according to claim 45, wherein the second key is generated from the original key and the random number according to the following formula:

$$(x+y)MOD(9)=i$$

where x and y are predetermined digits of the original key and the random number, respectively, and i is a resulting digit of the second key.

47. The method according to claim 45, wherein the third key is generated from the second key and the random number according to the following formula:

$$(x+y)MOD(9)=i$$

where x and y are predetermined digits of the second key and the random number, respectively, and i is a resulting digit of the third key.

48. The method according to claim 45, wherein the message key is generated from the second key and the third key according to the following formula:

$$(x+y)MOD(9)=i$$

where x and y are predetermined digits of the second key and the third key, respectively, and i is a resulting digit of the message key.

* * * * *

UNITED STATES PATENT AND TRADEMARK OFFICE
CERTIFICATE OF CORRECTION

PATENT NO. : 6,445,797 B1
DATED : September 3, 2002
INVENTOR(S) : Paul McGough

It is certified that error appears in the above-identified patent and that said Letters Patent is hereby corrected as shown below:

Column 28,
Line 47, before "a", change "location" to -- locating --.
Line 61, after "the", change "fist" to -- first --.

Column 29,
Line 48, before "at", change "stating" to -- starting --.
Lines 49 and 56, after "length" change "j=log2 k" to -- j=log2k --.
Line 60, after "length" change "j=log3 k" to -- j=log2k --.

Signed and Sealed this

Seventeenth Day of June, 2003

JAMES E. ROGAN
*Director of the United States Patent and Trademark Office*